United States Patent
Rihn et al.

(10) Patent No.: US 10,360,774 B1
(45) Date of Patent: Jul. 23, 2019

(54) METHOD AND DEVICE FOR ENABLING PITCH CONTROL FOR A HAPTIC EFFECT

(71) Applicant: Immersion Corporation, San Jose, CA (US)

(72) Inventors: William S. Rihn, San Jose, CA (US); Jason D. Fleming, San Jose, CA (US)

(73) Assignee: IMMERSION CORPORATION, San Jose, CA (US)

(*) Notice: Subject to any disclaimer, the term of this patent is extended or adjusted under 35 U.S.C. 154(b) by 0 days.

(21) Appl. No.: 15/863,233

(22) Filed: Jan. 5, 2018

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC .................................. G08B 6/00; G06F 3/016
USPC ...................................................... 340/407.1
See application file for complete search history.

(56) References Cited

U.S. PATENT DOCUMENTS

| | | | | |
|---|---|---|---|---|
| 9,520,036 | B1* | 12/2016 | Buuck | G08B 6/00 |
| 2005/0030284 | A1 | 2/2005 | Braun et al. | |
| 2012/0188180 | A1* | 7/2012 | Yang | G06F 3/016 |
| | | | | 345/173 |
| 2014/0118127 | A1* | 5/2014 | Levesque | G06F 3/016 |
| | | | | 340/407.2 |
| 2015/0070149 | A1* | 3/2015 | Cruz-Hernandez | G06F 3/016 |
| | | | | 340/407.1 |
| 2015/0084875 | A1* | 3/2015 | Liu | G06F 3/016 |
| | | | | 345/173 |
| 2016/0063826 | A1* | 3/2016 | Morrell | G08B 6/00 |
| | | | | 340/407.1 |
| 2016/0232943 | A1* | 8/2016 | Lacroix | G11B 27/322 |
| 2016/0259480 | A1* | 9/2016 | Augenbergs | G06F 3/016 |
| 2018/0158289 | A1* | 6/2018 | Vasilev | H02P 25/032 |

FOREIGN PATENT DOCUMENTS

| | | |
|---|---|---|
| EP | 2728445 A2 | 5/2014 |
| EP | 2728445 A2 | 7/2014 |
| EP | 3028750 A2 | 6/2016 |
| EP | 3028750 A2 | 8/2016 |
| WO | WO-2018121894 A1 * | 7/2018 ........... G06F 1/1613 |

OTHER PUBLICATIONS

The partial European search report (R. 64 EPC) issued in European Application No. 19150277.2-1216 dated Mar. 29, 2019.
The Partial European Search Report issued in European Application No. 19150277.2, dated Mar. 29, 2019.

* cited by examiner

*Primary Examiner* — Hirdepal Singh
(74) *Attorney, Agent, or Firm* — Medler Ferro Woodhouse & Mills PLLC

(57) ABSTRACT

A method of generating haptic effects on a haptic-enabled device having a control unit and a haptic output device is provided. The method comprises receiving a haptic track that describes a time-varying magnitude envelope for driving the haptic output device to generate a haptic effect. The method further comprises generating a periodic drive signal with a time-varying frequency that is based on magnitude values of the time-varying magnitude envelope described in the haptic track. The method further comprises outputting the periodic drive signal to the haptic output device, to cause the haptic output device to generate the haptic effect based on the periodic drive signal.

19 Claims, 19 Drawing Sheets

Haptic Track  107A

Haptic Track  107B

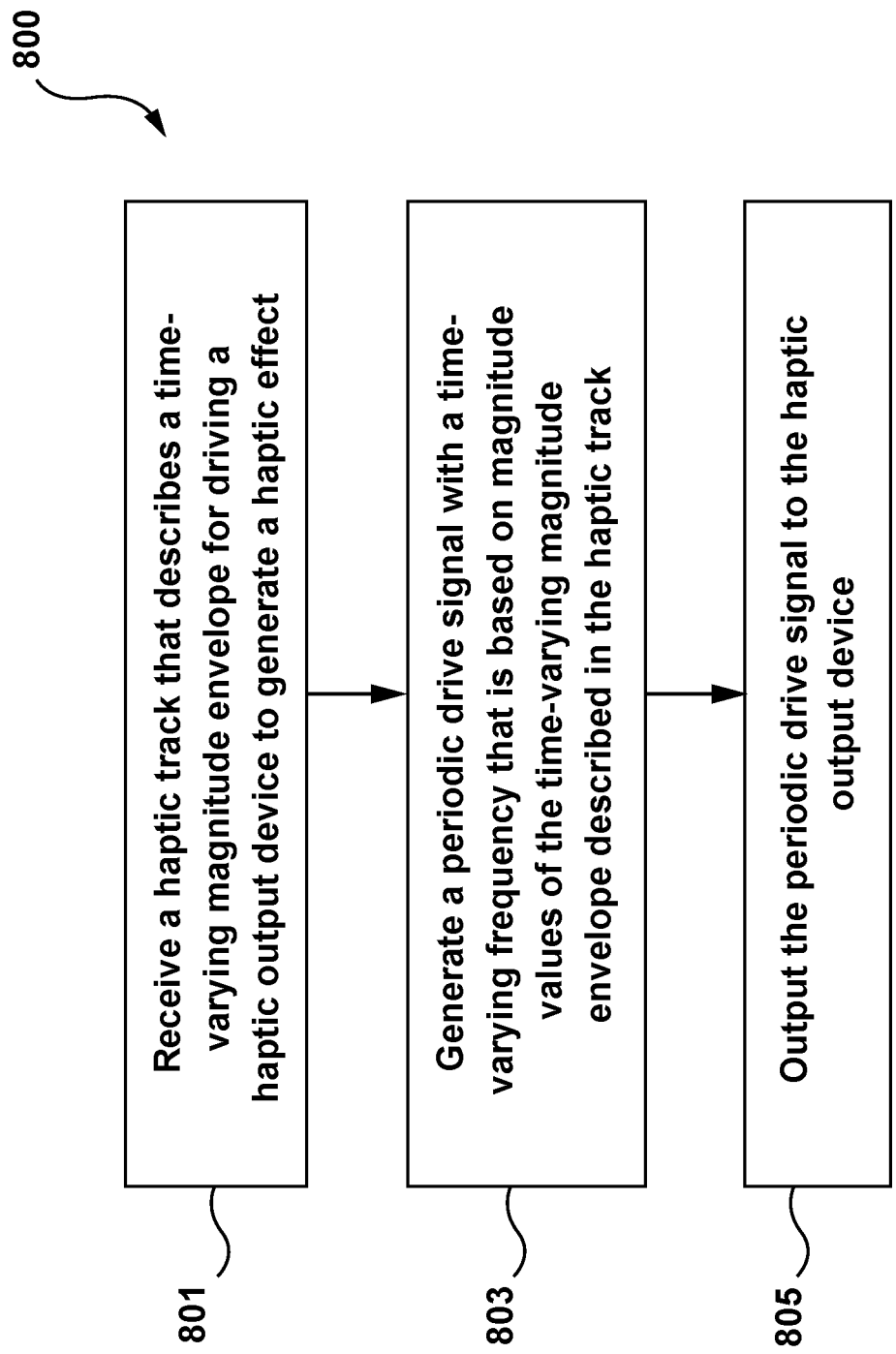

METHOD AND DEVICE FOR ENABLING PITCH CONTROL FOR A HAPTIC EFFECT

FIELD OF THE INVENTION

The present invention is directed to a method and device for enabling pitch control for a haptic effect, and has application in user interfaces, gaming, and consumer electronics.

BACKGROUND

As electronic user interface systems become more prevalent, the quality of the interfaces through which humans interact with these systems is becoming increasingly important. Haptic feedback, or more generally haptic effects, can improve the quality of the interfaces by providing cues to users, providing alerts of specific events, or providing realistic feedback to create greater sensory immersion within a virtual environment. Examples of haptic effects include kinesthetic haptic effects (such as active and resistive force feedback), vibrotactile haptic effects, and electrostatic friction haptic effects.

SUMMARY

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One aspect of the embodiments herein relate to a method of generating haptic effects on a haptic-enabled device having a control unit and a haptic output device, the method comprising: receiving, by the control unit, a haptic track that describes a time-varying magnitude envelope for driving the haptic output device to generate a haptic effect. The method further comprises generating, by the control unit, a periodic drive signal with a time-varying frequency that is based on magnitude values of the time-varying magnitude envelope described in the haptic track. The method further comprises outputting, by the control unit, the periodic drive signal to the haptic output device, to cause the haptic output device to generate the haptic effect based on the periodic drive signal.

In an embodiment, the haptic track is associated with a first type of haptic output device, and wherein the haptic output device is a second type of haptic output device different than the first type of haptic output device.

In an embodiment, the first type of haptic output device is designed to be driven at only a single frequency, and the second type of haptic output device is designed to be driven in a range of frequencies having a nonzero bandwidth, such that the second type of haptic output device has a nonzero acceleration bandwidth.

In an embodiment, the first type of haptic output device is a standard-definition haptic output device, and the second type of haptic output device is a high-definition haptic output device.

In an embodiment, the standard-definition haptic output device includes at least one of an eccentric rotating mass (ERM) actuator designed to be driven with only a direct current (DC) signal, or a linear resonant actuator (LRA) designed to be driven at only a single frequency.

In an embodiment, the high-definition haptic output device includes a second LRA designed to be driven in a range of frequencies having a nonzero bandwidth, such that the second LRA has a nonzero acceleration bandwidth.

In an embodiment, the high-definition haptic output device includes at least one of a piezoelectric actuator or an electroactive polymer (EAP) actuator.

In an embodiment, the method further comprises determining whether the haptic track is associated with the first type of haptic output device or with the second type of haptic output device, and whether the haptic output device is the first type of haptic output device or the second type of haptic output device. The step of generating the periodic drive signal with the time-varying frequency based on values of the time-varying magnitude envelope is performed only in response to a determination that the haptic track is associated with the first type of haptic output device and a determination that the haptic output device is the second type of haptic output device.

In an embodiment, the periodic drive signal has a constant magnitude over time, and alternates between one or more positive voltage values or current values and one or more negative voltage values or current values.

In an embodiment, the periodic drive signal includes only one or more positive voltage values or current values, one or more negative voltage values or current values, and one or more zero crossing points, and does not have any nonzero duration of zero voltage value or zero current value.

In an embodiment, the time-varying magnitude envelope described by the haptic track is not a periodic waveform.

In an embodiment, the step of generating the periodic drive signal is based on a defined mapping between the magnitude values of the time-varying magnitude envelope and frequency values of the periodic drive signal.

In an embodiment, the magnitude values of the time-varying magnitude envelope are in a range between a defined magnitude envelope lower limit and a defined magnitude envelope upper limit, wherein the haptic output device has at least one resonant frequency value, and wherein the defined mapping maps the defined magnitude envelope upper limit to the at least one resonant frequency value, and maps one or more other magnitude values of the time-varying magnitude envelope to one or more non-resonant frequency values.

In an embodiment, the defined mapping defines a linear relationship between magnitude values of the time-varying magnitude envelope and frequency values of the periodic drive signal.

In an embodiment, the defined mapping is based on a frequency response profile of the haptic output device, wherein the frequency response profile describes how haptic effect magnitude of the haptic output device varies as a function of drive signal frequency.

In an embodiment, the periodic drive signal is a sinusoidal wave that alternates between positive voltage values and negative voltage values, or is a square wave that alternates between a positive voltage value and a negative voltage value.

One aspect of the embodiments herein relate to a method of generating haptic effects on a haptic-enabled device having a control unit and a haptic output device. The method comprises receiving, by the control unit, a haptic track that describes a time-varying magnitude envelope for driving the haptic output device to generate a haptic effect. The method further comprises generating, by the control unit, a drive signal that includes a series of pulses having respective pulse durations, wherein the series of pulses are separated by separation durations in which the drive signal has a voltage value or a current value of zero, wherein at least one of the pulse durations or the separation durations are based on magnitude values of the time-varying magnitude envelope described in the haptic track, and wherein at least two pulse durations of the respective pulse durations are different, or at least two of the separation durations are different. The method further comprises outputting, by the control unit, the drive signal to the haptic output device, to cause the haptic output device to generate the haptic effect based on the drive signal.

In an embodiment, the haptic track is associated with a first type of haptic output device, and wherein the haptic output device is also the first type of haptic output device.

In an embodiment, the first type of haptic output device is a standard-definition haptic output device.

In an embodiment, the standard-definition haptic output device includes at least one of a linear resonant actuator (LRA) designed to be driven at only a single frequency, or eccentric rotating mass (ERM) actuator designed to be driven with only a DC signal.

In an embodiment, generating the drive signal comprises: determining a maximum magnitude value of the time-varying magnitude envelope, the maximum magnitude value being a first magnitude value; determining, as a second magnitude value, a magnitude value for the drive signal based on the first magnitude value; multiplying the second magnitude value by an attenuation factor to determine a third magnitude value, wherein the attenuation factor is less than 1, and wherein each pulse of the series of pulses is generated with the third magnitude value.

In an embodiment, at least two pulse durations of the respective pulse durations are different, and all of the separation durations are the same.

One aspect of the embodiments herein relate to a haptic-enabled device comprising: a haptic output device, a communication interface, a memory, and a control unit. The control unit is configured to receive, from the communication interface or the memory, a haptic track that describes a time-varying magnitude envelope for driving the haptic output device to generate a haptic effect. The control unit is further configured to generate a periodic drive signal with a time-varying frequency that is based on values of the time-varying magnitude envelope described in the haptic track. The control unit is further configured to output the periodic drive signal to the haptic output device, to cause the haptic output device to generate the haptic effect based on the periodic drive signal.

One aspect of the embodiments herein relate to a haptic-enabled device comprising: a haptic output device, a communication interface, a memory, and a control unit. The control unit is configured to receive, from the communication interface or the memory, a haptic track that describes a time-varying magnitude envelope for driving the haptic output device to generate a haptic effect. The control unit is further configured to generate a drive signal that includes a series of pulses having respective pulse durations, wherein the series of pulses are separated by separation durations in which the drive signal has a voltage value or a current value of zero, wherein at least one of the pulse durations or the separation durations are based on magnitude values of the time-varying magnitude envelope described in the haptic track, and wherein at least two pulse durations of the respective pulse durations are different, or at least two of the separation durations are different. The control unit is further configured to output the drive signal to the haptic output device, to cause the haptic output device to generate the haptic effect based on the drive signal.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 8 provides a flow diagram that illustrates steps of a method for generating a haptic effect with a periodic drive signal, according to an embodiment hereof.

DETAILED DESCRIPTION

Figure 1A:
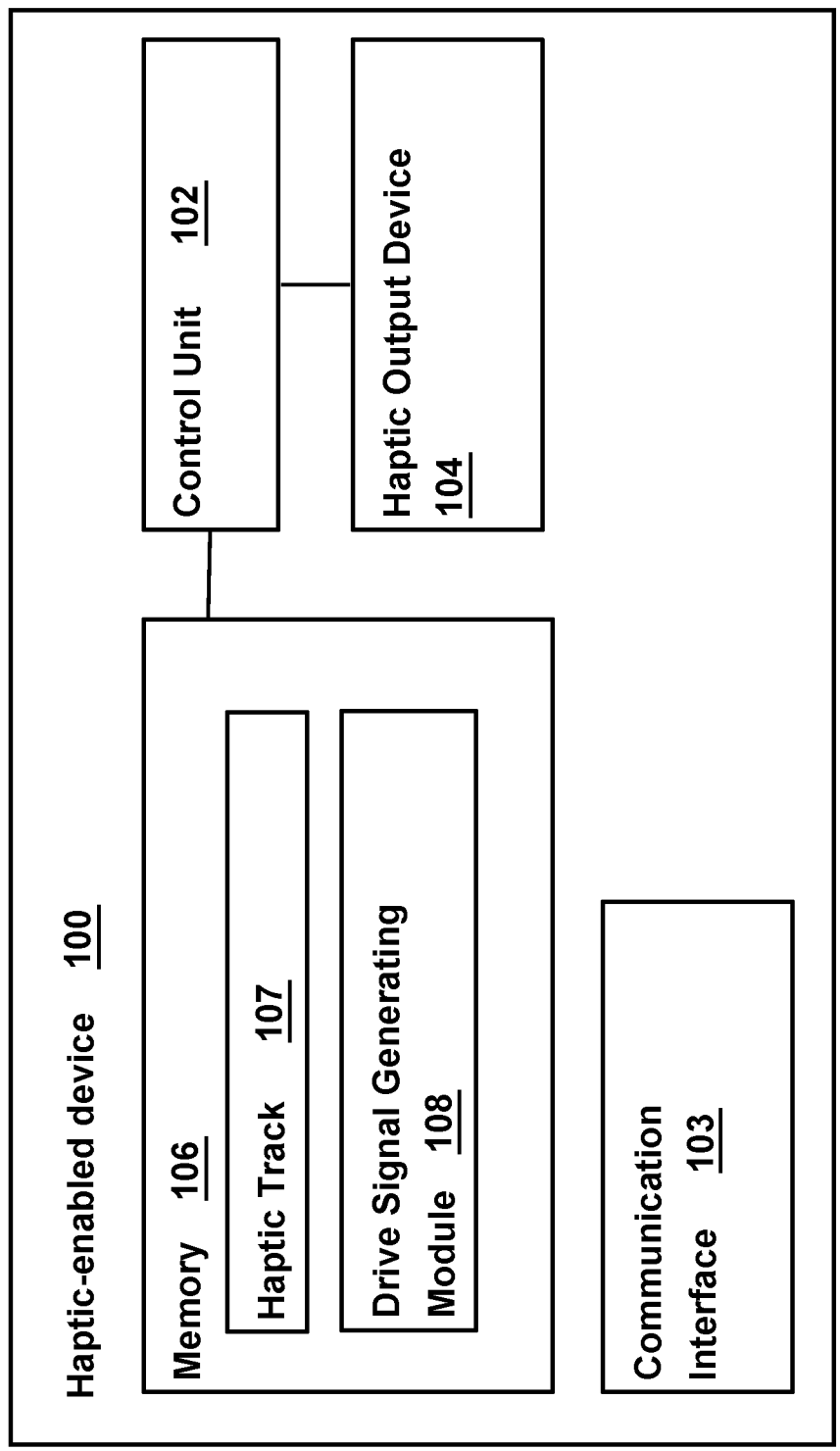
FIGS. 1A and 1B depict haptic-enabled devices for generating a haptic effect, according to embodiments hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to pitch control for a haptic effect, and more specifically to adjusting a pitch at which a haptic effect is perceived, by adjusting a frequency of a periodic drive signal used to generate the haptic effect, or adjusting pulse duration or pulse separation for any pulses in a drive signal.

More particularly, some embodiments herein relate to using magnitude information in a haptic track to vary frequency of a drive signal, in order to create a haptic effect with varying frequency. In some instances, the haptic track may have been authored for or otherwise associated with a first type of haptic output device, e.g., a standard-definition, or SD, haptic output device, while the drive signal may be used to drive a second type of haptic output device, e.g., a high-definition, or HD, haptic output device. The drive signal may vary in frequency, which may cause the haptic effect generated by the haptic output device to vary in frequency. Because the haptic effect has a varying frequency, a user may perceive the haptic effect to vary in pitch or, more generally, to vary in tone. In an embodiment, the frequency values for the drive signal may be based on magnitude values of the magnitude envelope described by the haptic track. For instance, low magnitude values in the haptic track may be translated to a low frequency value for the drive signal, which may in turn cause the haptic output device to generate a haptic effect with at least one portion that is perceived as having a low pitch sensation. Because a low-pitch sensation may feel softer or smoother to the user as compared with a high-pitch sensation, the user may find the low-pitch sensation to be more pleasant. Further, a high frequency value for the drive signal may generate a haptic effect with a portion that is perceived as having a high pitch, which a user may also find enjoyable because the sensation is sharp and distinctive. Thus, generating a haptic effect with a drive signal that varies in frequency, according to the embodiments herein, may provide a superior user experience compared with using a drive signal that changes only in magnitude. Moreover, these embodiments allow a haptic track that may have been authored for the first type of haptic output device, e.g., SD haptic output device, to be adapted for the second haptic output device, e.g., HD haptic output device, without requiring manual intervention from the author or other user.

In an embodiment, various magnitude values in the haptic track may be mapped in a memory to various frequency values. In some instances, higher magnitude values may be mapped to frequency values that are closer to a resonant frequency value of a haptic output device, and lower magnitude values may be mapped to frequency values that are farther from the resonant frequency value of the haptic output device. In some cases, the haptic output device may experience a decay in magnitude as it operates away from its resonant frequency or resonant frequencies. Thus, if lower magnitude values are mapped to frequency values that are farther from the resonant frequency, the resulting haptic effect from those frequency values may feel softer because of the decay in magnitude.

Some embodiments herein relate to using magnitude information in a haptic track to vary pulse duration or vary pulse separation, i.e., the separation between pulses, in a drive signal having a series of pulses. In some cases, this technique may be used to generate a drive signal for driving a SD haptic output device. By varying pulse durations or varying the durations separating the pulses, which may be referred to as separation durations, the resulting haptic effect may also be perceived by the user as varying in pitch. For instance, when the drive signal has longer pulse durations and/or shorter separation durations, the resulting haptic effect may be perceived to have a higher pitch. When the drive signal has shorter pulse durations and/or longer separation durations, the resulting haptic effect may be perceived to have a lower pitch. In an embodiment, the above technique may also involve weakening the pulses in magnitude. Weakening the pulses may, in some situations, decrease how strongly a user perceives portions of the haptic effect corresponding to transitions between a pulse and a gap between the pulses. Decreasing how strongly these transitions are felt may result in a haptic effect that feels less choppy, and instead may be felt more as a smooth tone.

FIG. 1A illustrates a haptic-enabled device 100 configured to generate a haptic effect based on a haptic track 107. The haptic-enabled device 100 may be, e.g., a mobile phone, a tablet computer, a handheld game controller (e.g., Nintendo Switch® controller), a wearable device, e.g., an electronic watch or a head-mounted device, or HMD), a computer peripheral device such as a mouse or stylus, or any other haptic-enabled device. The haptic-enabled device 100 may be configured to generate a haptic effect at a user interface, such as a touch screen, of the device 100, at a surface of a housing the haptic-enabled device 100, and/or at any other location. In an embodiment, the haptic-enabled device 100 may include a control unit 102, a haptic output device 104, a memory 106, and a communication interface 103. Further, the memory 106 may store a haptic track 107 and a drive signal generating module 108.

In an embodiment, the control unit 102 may be configured to generate a drive signal for the haptic output device 104 based on the haptic track 107 stored in memory 106. In the embodiment of FIG. 1A, the control unit 102 may be configured to generate the drive signal by executing instructions provided by the drive signal generating module 108, which is also stored in memory 106. The control unit 102 may, in an embodiment, be implemented as one or more processors (e.g., a microprocessor), a field programmable gate array (FPGA), application specific integrated circuit (ASIC), programmable logic array (PLA), or other control circuit. The control unit 102 may be part of a general purpose control circuit for the haptic-enabled device 100, such as a processor for executing an operating system or for implementing other functionality of the haptic-enabled device, or the control unit 102 may be a control circuit dedicated to controlling haptic effects. In an embodiment, the control circuit may include any amplifier circuit, any digital to analog converter (DAC), or any other circuit for creating a drive signal that can drive the haptic output device 104.

As mentioned above, the haptic track 107 may have been intended for or otherwise associated with a first type of haptic output device. In an embodiment, the haptic output device 104 may be a second type of haptic output device that is different than the first type of haptic output device. The first type of haptic output device may include, e.g., haptic output devices that are designed or otherwise intended to be driven at a single frequency or within a narrow band of frequencies, or to be driven with a direct current (DC) signal, e.g., a DC voltage signal. In some instances, the first type of haptic output device may include haptic output devices that are programmed or otherwise designed to operate at only a single frequency. The second type of haptic output devices may include, e.g., haptic output devices that are programmed or otherwise designed to be driven in a range of frequencies having a nonzero bandwidth, i.e., a bandwidth that is greater than a single frequency. The range of frequencies for the nonzero bandwidth may extend from $f_a$ to $f_b$, in which $f_b$ is greater than $f_a$. In an embodiment, the second type of haptic output device may have a structure that supports a nonzero acceleration bandwidth, i.e., an acceleration bandwidth that is greater than a single frequency, for movement of that structure. In an embodiment, the nonzero acceleration bandwidth may also extend from $f_a$ to $f_b$. In an embodiment, the first type of haptic output device does not support periodic motion, or supports periodic motion at only a single frequency. In an embodiment, the first type of haptic output device may be a standard-definition (SD) haptic output device, such as an eccentric rotating mass (ERM) actuator that is designed to be driven with a DC signal, or a linear resonant actuator (LRA) designed to be driven at only a single frequency. In an embodiment, the second type of haptic output device may be a high-definition (HD) haptic output device, such as a piezoelectric actuator, electroactive polymer (EAP) actuator, any other smart material actuator, or a wideband LRA. The piezoelectric actuator, EAP actuator, and wideband LRA may each be designed to be driven in a range of frequencies having a nonzero bandwidth, i.e., a bandwidth that is greater than a single frequency, and may each have a structure that supports a nonzero acceleration bandwidth for motion of that structure. In some instances, the HD haptic output device may include an ERM actuator that is designed to be driven with an alternating current (AC) signal, and is further designed to be driven in a range of frequencies having a nonzero bandwidth. In such an example, the ERM actuator may further have a nonzero acceleration bandwidth. In an embodiment, a haptic output device 104 may include a vibrotactile haptic actuator configured to generate a haptic effect. In an embodiment, a haptic output device 104 may include an ultrasound emitter configured to generate an ultrasound-based haptic effect. In an embodiment, a haptic output device 104 may have a single resonant frequency or multiple resonant frequencies. In an embodiment, a haptic output device 104 may have no resonant frequency.

In another embodiment, the haptic track 107 may be associated with the first type of haptic output device, and the haptic output device 104 may also be the first type of haptic output device. For instance, the haptic track 107 may have been authored for a LRA that is designed to be driven at only a single frequency, and the haptic output device 104 may also be such a LRA.

In an embodiment, the memory 106 may be a non-transitory computer-readable medium, and may include read-only memory (ROM), random access memory (RAM), a solid state drive (SSD), a hard drive, or other type of memory. In FIG. 1A, the memory 106 stores a haptic track 107 and a drive signal generating module 108. The drive signal generating module 108 may include a plurality of instructions that can be executed by the control unit 102 to generate a drive signal according to an embodiment herein. In an embodiment, the memory 106 may store other haptic tracks in addition to haptic track 107, and may store other modules in addition to the drive signal generating module 108.

In an embodiment, the communication interface 103 may be configured to communicate with another device, such as a desktop computer, or with a network, such as the Internet. The communication interface 103 may, for instance, be used to receive (e.g., download) the haptic track 107 from another device or from a network.

Figure 1B:
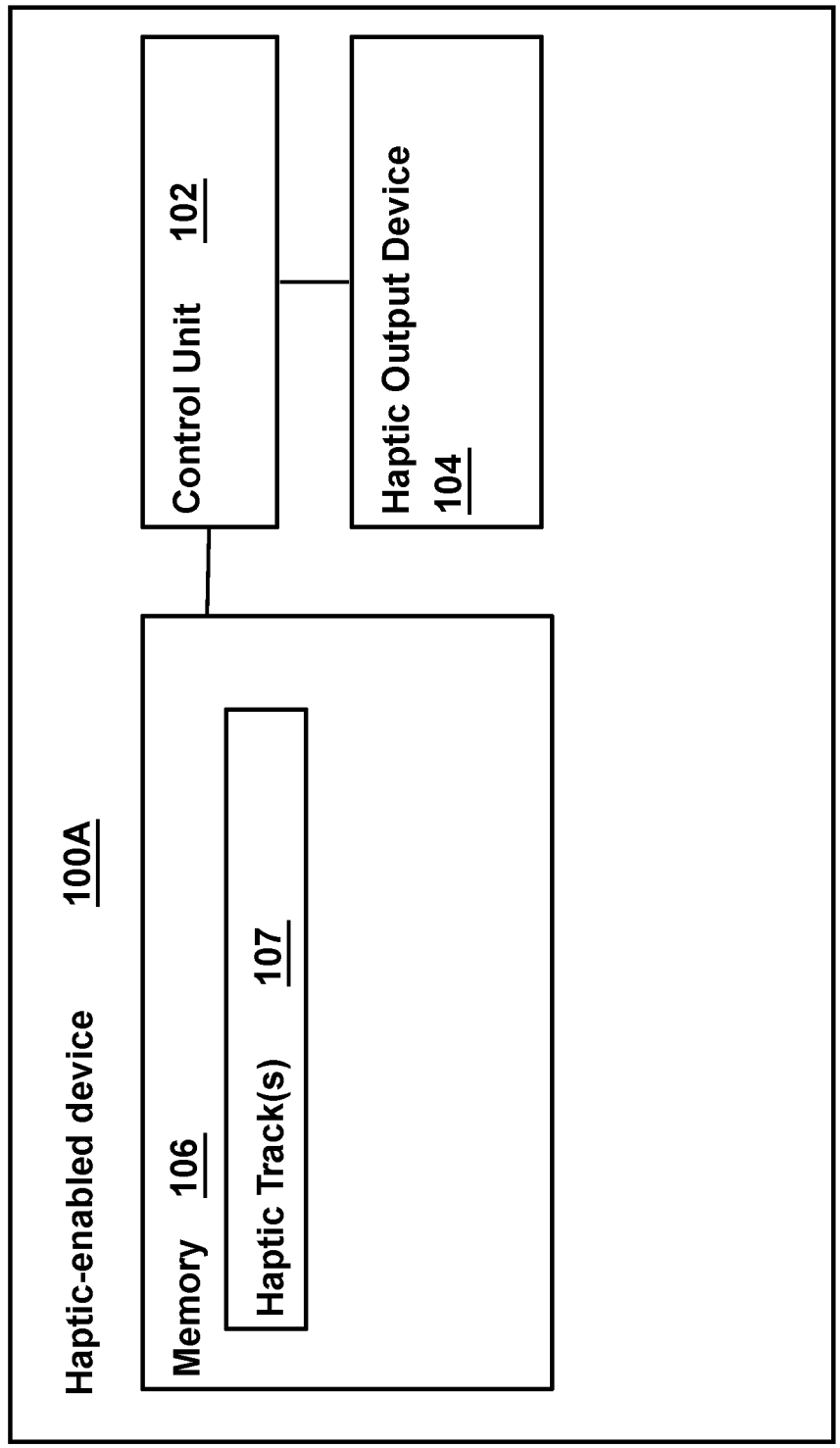

In FIG. 1A, the instructions of the drive signal generating module 108 may be software instructions for generating a drive signal. FIG. 1B illustrates an embodiment of a haptic-enabled device 100A in which the functionality of generating a drive signal for a haptic output device 104 may be implemented in hardware, rather than in software. For instance, a control unit 102 in FIG. 1B may be an ASIC or FPGA that, rather than execute instructions from a module stored in memory 106, may have logic or other circuitry that are preconfigured to generate a drive signal based on a haptic track 107, according to the embodiments herein.

Figure 2A:
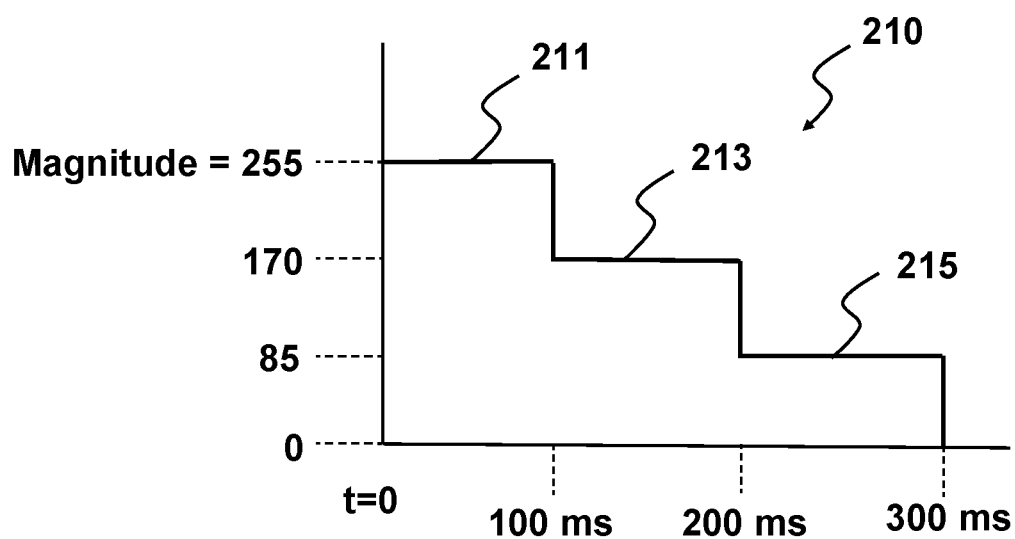
FIGS. 2A and 2B depict magnitude envelopes that are described in haptic tracks, according to embodiments hereof.
Figure 2B:
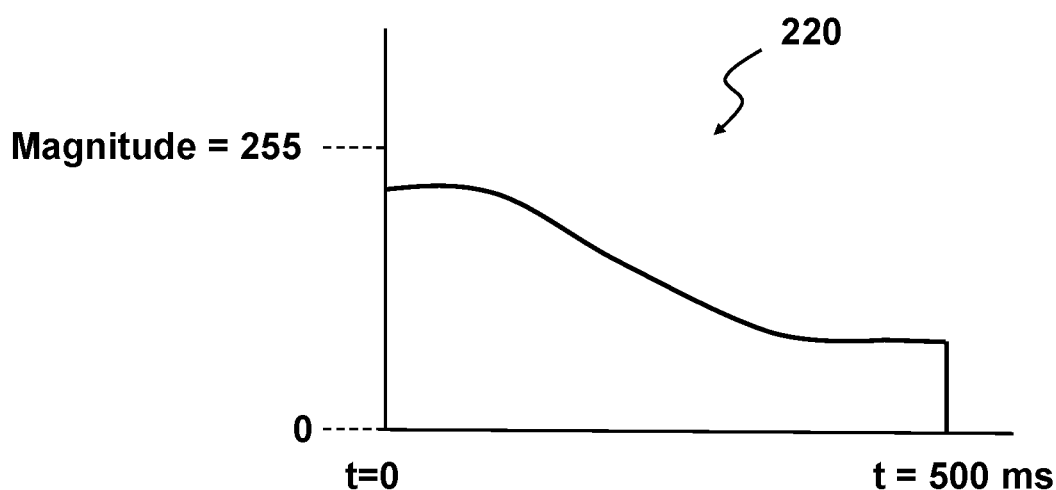

FIGS. 2A and 2B depict an embodiment of a haptic track 107A and a haptic track 107B, respectively. In an embodiment, each of the haptic tracks 107A and 107B may be stored as a waveform file in the memory 106. In an embodiment, each haptic track 107A, 107B may describe a time-varying magnitude envelope for driving a haptic output device to generate a haptic effect. The haptic tracks 107A, 107B may describe the time-varying magnitude envelope as a waveform, as an equation, or in some other way. For instance, the haptic track 107A in FIG. 2A describes a time-varying magnitude envelope 210, wherein the magnitude envelope 210 is represented as a step-shaped waveform. The haptic track 107B in FIG. 2B describes a time-varying magnitude envelope 220, wherein the magnitude envelope 220 is represented as another, smoother waveform. The waveforms in FIGS. 2A and 2B may be described in the waveform files mentioned above. In some instances, waveforms for the haptic tracks 107A, 107B may have been authored by a user using, for example, a program or software development kit such as the TouchSense® platform.

As mentioned above, the haptic tracks 107A, 107B may each describe a time-varying magnitude envelope 210, 220 for driving a haptic output device to generate a haptic effect. In an embodiment, the magnitude envelopes 210, 220 may be formed by magnitude values depicted on the waveforms in FIGS. 2A and 2B. The magnitude envelopes 210, 220 may indicate an author's intent for how a magnitude of a haptic effect is to vary over time. The magnitude may refer to a peak intensity or peak-to-peak intensity of the haptic effect, or more generally refer to a peak value or peak-to-peak value. For instance, if the haptic effect is a vibration involving sinusoidal movement of the haptic output device 104, the magnitude may refer to peak-to-peak intensity of the sinusoidal movement. An increase in magnitude of the haptic effect may represent an increase in peak-to-peak intensity of the sinusoidal movement, while a decrease in magnitude of the haptic effect may represent a decrease in peak-to-peak intensity of the sinusoidal movement. The time-varying magnitude envelope 210, 220 may also be referred to as a waveform 210, 220 describing a time-varying magnitude of a haptic effect. The waveform 210, 220 may be part of a haptic track 107A, 107B, which may more generally be referred to as a haptic effect definition. In other words, the control unit 102 may receive a haptic effect definition that defines a time-varying magnitude for a haptic effect, and generate a drive signal with time-varying frequency based on the time-varying magnitude in the haptic effect definition. For instance, values of the time-varying magnitude described by the waveform 210, 220 may be mapped to values of the time-varying frequency, as discussed in more detail below. Further, the term magnitude or magnitude value may also be used with respect to a drive signal, to refer to a peak voltage value of peak current value of a waveform making up the drive signal, or a peak-to-peak voltage value or peak-to-peak current value a waveform making up the drive signal.

In an embodiment, the magnitude envelopes 210, 220 may be described by the haptic tracks 107A, 107B as waveforms that vary in value over time. For instance, the time-varying magnitude envelope 210 is a waveform that includes a first portion 211, a second portion 213, and a third portion 215 with three different respective magnitude values. The first portion 211 of the magnitude envelope 210 has a magnitude value of 255, and corresponds to a time from t=0 to t=100 ms. The second portion 213 of the magnitude envelope 210 has a magnitude value of 170, and corresponds to a time from t=100 ms to t=200 ms. The third portion 215 of the magnitude envelope 210 has a magnitude value of 85, and corresponds to a time of t=200 ms to t=300 ms. In an embodiment, the magnitude values described in the haptic track may be dimensionless scalar values, such as scalar values with no units, used to indicate a shape for a magnitude of the haptic effect. In both the embodiments of FIGS. 2A and 2B, the magnitude values may be between a defined magnitude envelope lower limit (e.g., 0) and a defined magnitude envelope upper limit (e.g., 255). In some cases, these limits may be based on how many bits represent the magnitude values. In an embodiment, the control unit 102 may convert a dimensionless magnitude value of the magnitude envelope 210 to a voltage value or current value for a drive signal. For instance, the control unit 102 may map the magnitude envelope upper limit of 255 to a driving voltage upper limit (e.g., 5 V).

In an embodiment, the haptic tracks 107A, 107B may be associated with a first type of haptic output device, such as a SD haptic output device, e.g., an ERM actuator designed to be driven with only a DC signal or a LRA designed to be driven at only a single frequency. In some cases, a haptic track for the first type of haptic output device involves a magnitude envelope that is not a periodic waveform, even if the drive signal will include a periodic waveform. In other words, in some instances the magnitude envelope may be used to specify a magnitude for the drive signal or a magnitude of the haptic effect, rather than the actual waveform of the drive signal or the actual waveform of the haptic effect. For instance, if the drive signal is a sinusoidal signal for driving a LRA, the magnitude envelope (e.g., 210/220) for the drive signal may not be a sinusoidal signal or other periodic waveform. In some instances, the magnitude envelope 210, 220, while not being a periodic waveform, may be used to specify the actual waveform of a drive signal. For example, an ERM actuator may be driven with a drive signal having a same waveform as that of the magnitude envelope 210.

Figure 3A:
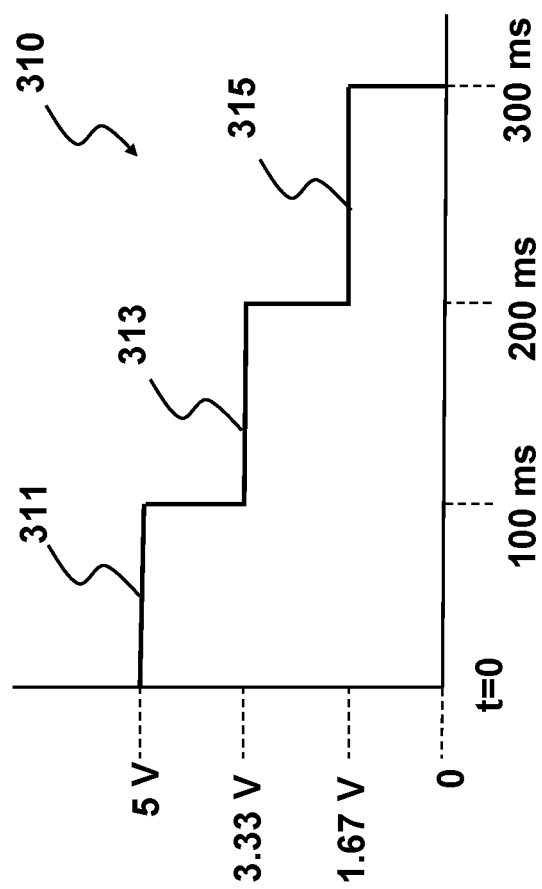
FIGS. 3A and 3B depict drive signals with time-varying magnitude based on magnitude values of a time-varying magnitude envelope, according to embodiments hereof.

As discussed above, embodiments herein relate to generating a drive signal that varies in frequency over time, instead of or in addition to a drive signal that varies in magnitude over time. FIGS. 3A-3D illustrate a drive signal that varies in magnitude over time based on the time-varying magnitude envelope 210 described in the haptic track 107A. More specifically, FIG. 3A illustrates a drive signal 310 that is generated to drive a haptic output device, such as an ERM actuator. The drive signal 310 may include a first portion 311, a second portion 313, and a third portion 315. As depicted in FIG. 3A, the drive signal 310 may be a DC signal that matches a shape of the waveform of the magnitude envelope 210 described by the haptic track 107A. More specifically, the magnitude envelope 210 in FIG. 2A includes a step at time t=100 ms, from a magnitude value of the first portion 211 of the magnitude envelope 210 to a magnitude value of the second portion 213 of the magnitude envelope 210. Similarly, the drive signal 310 may also have a step at time t=100 ms, from a voltage value of 5 V in the first portion 311 of the drive signal 310 to a voltage value of 3.33 V in the second portion 313. Additionally, to correspond with the step at time t=200 ms from the magnitude value in the second portion 213 to the magnitude value of the third portion 215 of the magnitude envelope 210, the drive signal 310 may also have a step at t=200 ms, from the voltage value of 3.33 V of the second portion 313 to the voltage value of 1.67 V in the third portion 315 of the drive signal 310. In the above embodiments, a magnitude envelope upper limit (e.g., 255) may map to a driving voltage upper limit (e.g., 5 V). In another embodiment, a magnitude envelope upper limit may map to a different voltage value for a drive signal.

In an embodiment, the drive signal 310 has only positive voltage values or current values. In another embodiment, the drive signal 310 may be modified to have only negative voltage values or current values. In both embodiments, the drive signal 310 may exclude any voltage value or current value of zero. The voltage value or current value of zero may refer to a digital value of zero or an analog value that is less than or equal to a level of background electrical noise (e.g., 500 mV).

Figure 3B:
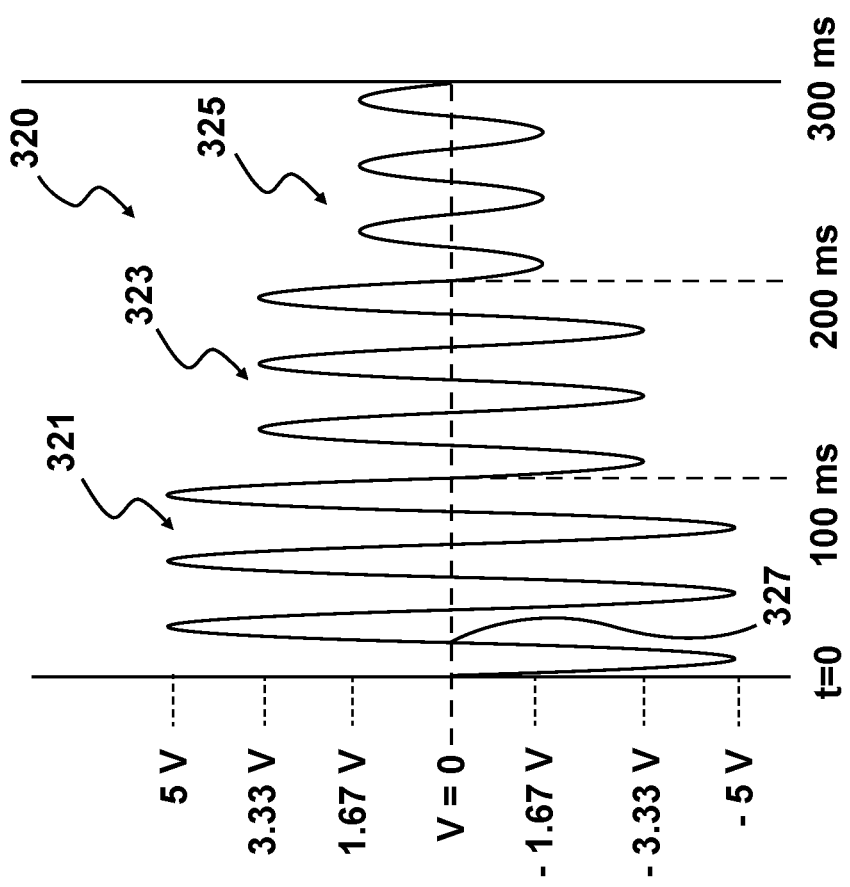

FIG. 3B illustrates a periodic drive signal 320 that is generated to drive a haptic output device, such as a LRA designed to be driven at only a single frequency. The drive signal 320 may include a first portion 321, a second portion 323, and a third portion 325. The drive signal 320 may be a periodic signal with a time-varying magnitude that matches the magnitude envelope 210 described in haptic track 107A. For instance, the drive signal 320 may also include a step at t=100 ms, from a magnitude value of 10 $V_{pp}$ in the first portion 321 of the drive signal 320 to a magnitude value of 6.66 $V_{pp}$ in the second portion 323 of the drive signal 320. Further, the drive signal may include another step at t=200 ms, from the magnitude value of 6.66 $V_{pp}$ in the second portion 323 of the drive signal 320 to a magnitude value 3.34 $V_{pp}$ of the third portion 325 of the drive signal 320. In an embodiment, the drive signal 320 may be a periodic drive signal that includes only positive voltage values, negative voltage values, and one or more zero crossing points, e.g., zero crossing point 327, at which the signal 320 has a voltage value or current value of zero for a single instant in time. Thus, the periodic drive signal 320 may alternate between positive voltage values and negative voltage values. In an embodiment, the drive signal 320 does not include any nonzero durations of zero voltage value or zero current value.

Figure 4A:
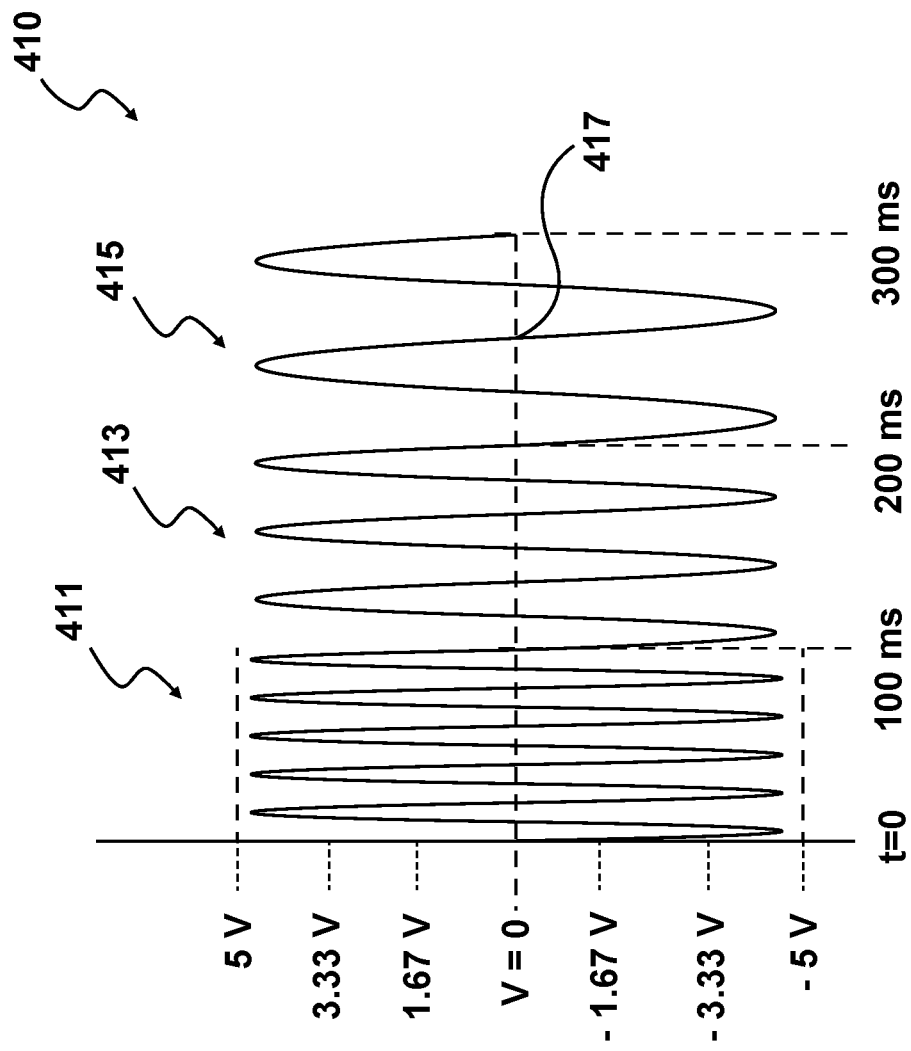
FIG. 4A depicts a periodic drive signal with time-varying frequency based on magnitude values of a time-varying magnitude envelope, according to an embodiment hereof.

While FIGS. 3A and 3B illustrate embodiments in which only a magnitude of a drive signal 310, 320 is varied over time based on the magnitude envelope 210 described in the haptic track 107A, FIG. 4A illustrates an embodiment in which a frequency of a drive signal 410 is varied over time based on a time-varying magnitude envelope described in a haptic track. More specifically, FIG. 4A depicts a periodic drive signal 410 that is generated based on the time-varying magnitude envelope 210 described in the haptic track 107A. The periodic drive signal 410 may be used to drive the haptic output device 104, such as an HD haptic output device. The drive signals 310 and 320 in FIGS. 3A and 3B may be used to drive a first type of haptic output device, while the drive signal 410 in FIG. 4A may be used to drive a second type of haptic output device. In an embodiment, the second type of haptic output device may have a wider bandwidth than the first type of haptic output device. In an embodiment, the HD haptic output device may include a piezoelectric actuator, an EAP actuator, other smart material actuator, or a wideband LRA, each of which may be designed to be driven in a range of frequencies having a nonzero bandwidth, and each of which may have a nonzero acceleration bandwidth.

As depicted in FIG. 4A, the periodic drive signal 410 may have a time-varying frequency that is based on magnitude values of the time-varying magnitude envelope 210. More specifically, the periodic drive signal 410 includes a first portion 411, a second portion 413, and a third portion 415 that have different respective frequencies $f_1$, $f_2$, and $f_3$. The frequency $f_1$ of the first portion 411 of the periodic drive signal may be based on a magnitude value of the first portion 211 of the magnitude envelope 210. Similarly, the frequency $f_2$ of the second portion 413 of the periodic drive signal 410 may be based on a magnitude value of the second portion 213 of the magnitude envelope 210, and the frequency $f_3$ of the third portion 415 of the drive signal 410 may be based on a magnitude value of the third portion 215 of the magnitude envelope 210. Thus, in the embodiment of FIG. 4A, the periodic drive signal 410 may be defined as sin(f(t)*t) or sin(2π*f(t)*t), wherein f(t)=$f_1$ for t=[0, 100 ms), wherein f(t)=$f_2$ for t=[100 ms, 200 ms), and wherein f(t)=$f_3$ for t=[200 ms, 300 ms). More generally speaking, the function f(t) may be any function that represents a time-varying magnitude envelope, such as a step function, a linear function, e.g., f(t)=slope*t, or another polynomial function, or any other function. While the periodic drive signal 410 in FIG. 4A has a sinusoidal waveform, another embodiment may involve a periodic drive signal with a triangular shape, square shape, or any other shape. For instance, the periodic drive signal may have a square waveform that is defined as a waveform that switches between a positive voltage value $v_0$ and a negative voltage value $-v_0$ every 1/(2*f(t)) seconds.

As discussed above, the periodic drive signal 410, which has time-varying frequency, may generate a haptic effect that also has time-varying frequency. For instance, the haptic effect may be a vibrotactile haptic effect that also exhibits frequency $f_1$, $f_2$, $f_3$ at time intervals corresponding to those in the periodic drive signal 410. As a result, the time-varying frequency of the periodic drive signal 410 may allow a user to perceive a resulting haptic effect as having a pitch that changes over time. For instance, a haptic effect generated from the periodic drive signal 410 may be perceived by a user as decreasing in pitch. The decrease in pitch may cause the haptic effect to feel soft to the user, who may perceive the softness of the haptic effect as a pleasant sensation.

In the embodiment of FIG. 4A, the periodic drive signal 410 has a constant magnitude, e.g., about 10 $V_{pp}$) over time. In another embodiment, the periodic drive signal 410 may have both a time-varying magnitude and time-varying frequency. In an embodiment, the periodic drive signal 410 alternates between positive voltage values or positive current values and negative voltage values or negative current values. The periodic drive signal 410 may also have one or more zero crossing points, such as zero crossing point 417. In some cases, the periodic drive signal 410 includes only the positive voltage values or current values, negative voltage values or current values, and one or more zero crossing points, and does not include any nonzero duration of zero voltage value or zero current value. As stated above, while FIG. 4A depicts a sinusoidal signal, another embodiment of the periodic drive signal 410 may be a different periodic signal, such as a square wave that alternates between a positive voltage value $v_0$ and a negative voltage value $-v_0$.

Figure 4B:
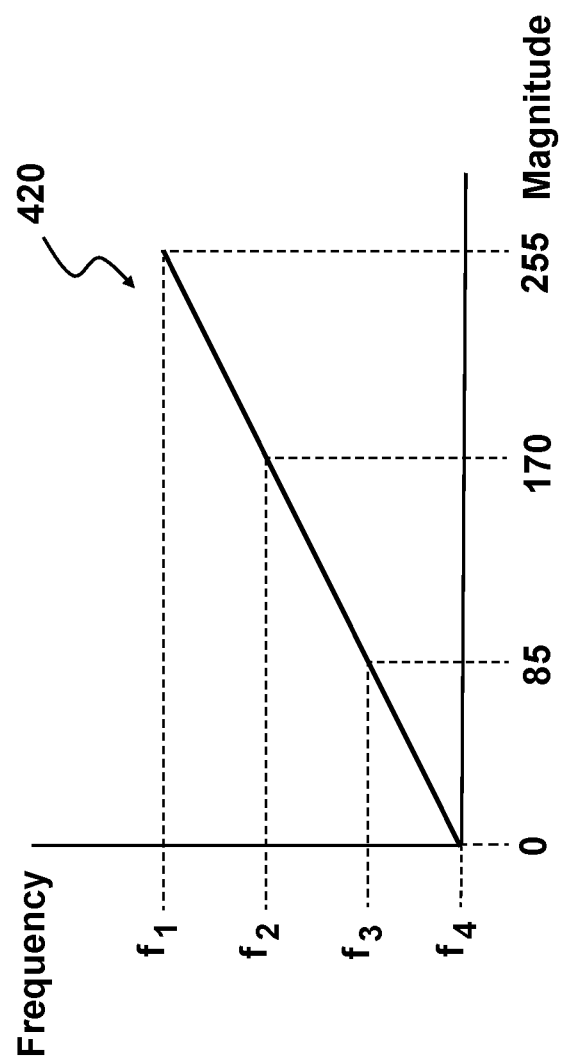
FIGS. 4B-4D depict example mappings between magnitude values and frequency values, according to an embodiment hereof.
Figure 4C:
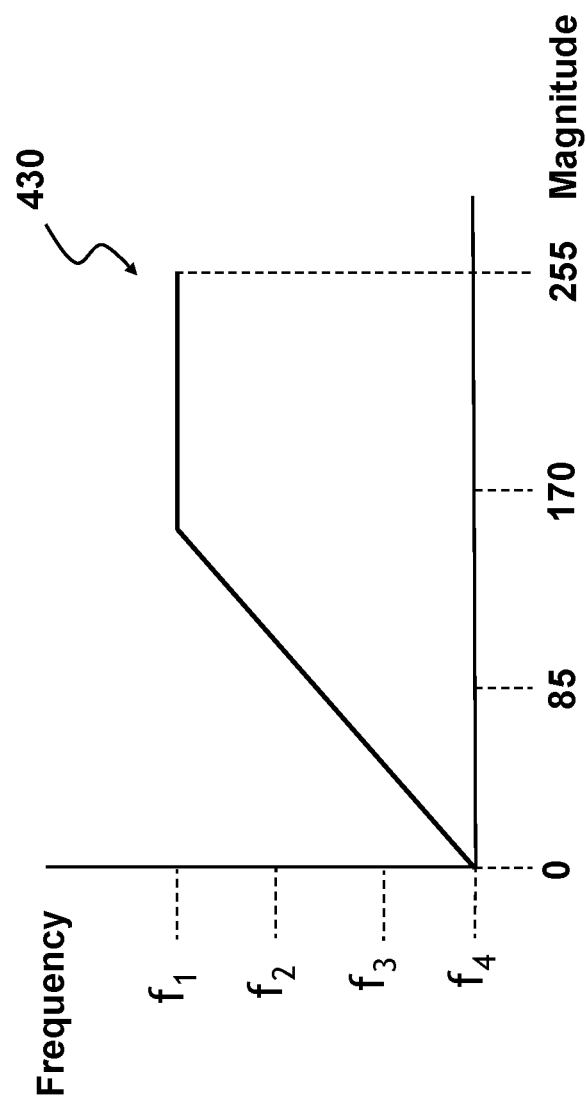
Figure 4D:
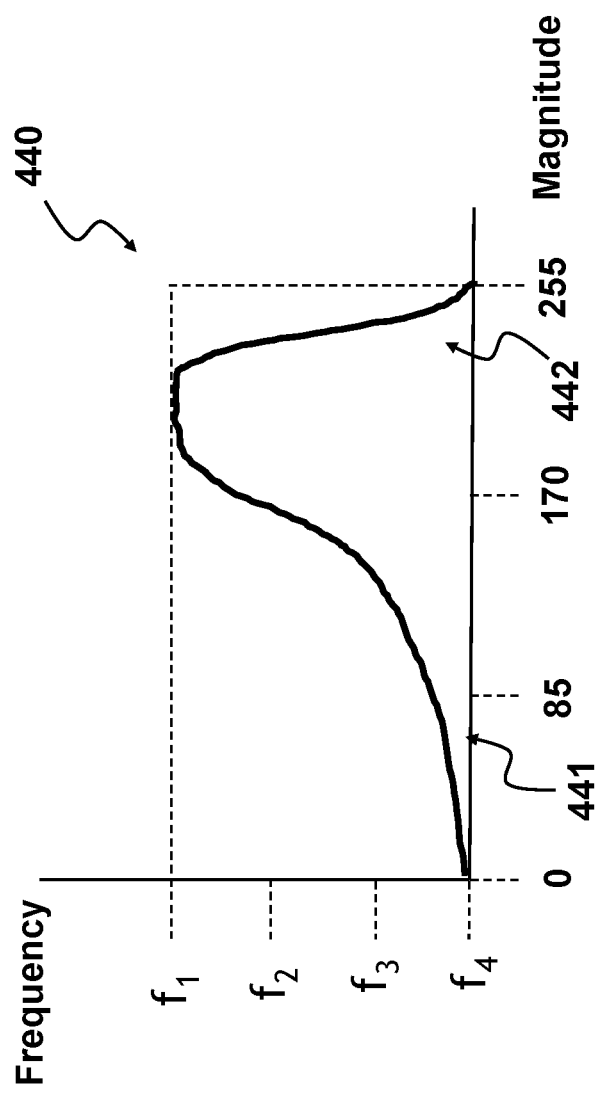

In an embodiment, the control unit 102 may determine a frequency value for a portion of the periodic drive signal 410 from a corresponding magnitude value of the time-varying magnitude envelope 210 based on a mapping between magnitude values and frequency values. The mapping may be stored as an equation, a look-up table, or in some other manner. FIGS. 4B-4D depict example mappings between magnitude values and frequency values. For instance, FIG. 4B illustrates a completely linear mapping 420 between magnitude values of the magnitude envelope 210 and frequency values for the time-varying frequency of the periodic drive signal 410. The linear mapping may describe a linear relationship between magnitude values and frequency values, such that as magnitude increases in value, frequency may increase linearly as a function of magnitude. The mapping in FIG. 4B may map a magnitude value of 255, which may be a defined magnitude envelope upper limit, to a frequency $f_1$. In an embodiment, the frequency $f_1$ may be a defined driving frequency upper limit for the haptic output device 104. In an embodiment, the frequency $f_1$ may be a resonant frequency of the haptic output device 104, while neither $f_2$ nor $f_3$ is a resonant frequency. For such an embodiment, the haptic output device 104 may in some cases have a frequency response profile in which the device 104 experiences decay in magnitude when it is not driven at a resonant frequency, wherein the frequency response profile describes how haptic effect magnitude of the haptic output device varies as a function of drive signal frequency. Thus, because neither frequency $f_2$ nor $f_3$ is a resonant frequency, a haptic effect generated by the haptic output device 104 may experience decay in magnitude when driven by the corresponding portions 413, 415 of the periodic drive signal, relative to when the haptic output device is driven by the resonant frequency of the portion 411 of the periodic drive signal 410. Accordingly, even if the periodic drive signal 410 has a constant magnitude over time, the haptic effect that is generated by the driving signal 410 may still vary in magnitude if the haptic output device 104 has a frequency response profile that exhibits decay in magnitude at non-resonant frequencies. Thus, such an embodiment may take advantage of decay characteristics in the frequency response profile of the haptic output device 104 to vary both the magnitude of the haptic effect and the pitch at which a user perceives the haptic effect.

In FIG. 4B, a magnitude value of zero may map to a frequency value $f_4$. In an embodiment, a frequency value $f_4$ may be a defined, nonzero driving frequency lower limit for a haptic output device 104. In another embodiment, a frequency value $f_4$ may be zero, which may correspond to a driving signal 410 having a constant voltage value or current value for a certain time interval. In yet another embodiment, a mapping may not define any frequency value to map to a magnitude value of zero, because such an embodiment may use a magnitude value of zero to denote an end of the drive signal.

FIG. 4C depicts a partially linear mapping 430 between magnitude values and frequency values. For instance, as magnitude of the time-varying magnitude envelope 210 increases in value from zero to 170, frequency of the periodic drive signal 410 may increase linearly from $f_4$ to $f_1$. The mapping in FIG. 4C may map all magnitude values that are greater than or equal to 170, which may be a defined threshold, to a frequency value of $f_1$, e.g., resonant frequency of the haptic output device 104.

FIG. 4D depicts an example mapping 440 that is based on a shape of a frequency response profile of the haptic output device 104. More specifically, the frequency response profile of the haptic output device 104 may be represented by a curve or other waveform that shows magnitude of a haptic effect as a function of frequency at which the haptic output device 104 is driven. For instance, the curve may show that the magnitude of the haptic effect decreases as a frequency of the drive signal moves away from a resonant frequency of the haptic output device, such as in regions 441 or 442 of the mapping 440. In the embodiment of FIG. 4D, the mapping 440 may have a magnitude-frequency relationship that has a same shape as the curve of the frequency response profile. In an embodiment, the mapping may cause the resulting drive signal to perform a frequency sweep from a first defined frequency to a second defined frequency (e.g., from $f_4$ to $f_1$).

As discussed above, various embodiments herein relate to using magnitude values from a magnitude envelope, such as time-varying magnitude envelope 210 of a haptic track 107A, to vary pulse duration or vary separation duration between pulses in a drive signal that has a series of pulses. These embodiments may replace or augment embodiments that vary only a magnitude of pulses. In an embodiment, the pulses may be used to drive a first type of haptic output device, such as a SD haptic output device. Further, the haptic track 107A may also have been authored for, or otherwise associated with, the same first type of haptic output device. In some cases, the first type of haptic output device may be designed or otherwise intended to be driven with, e.g., a pulse whose frequency content is limited to a single frequency, or a pulse that is not periodic, as discussed in more detail below. By varying the pulse durations or separation durations of the pulses, the resulting haptic effect may still be perceived as varying in pitch. Thus, these embodiments may also be used to drive the first type of haptic output device or other type of haptic output device to generate a haptic effect that feels dynamic and pleasant to a user.

Figure 5A:
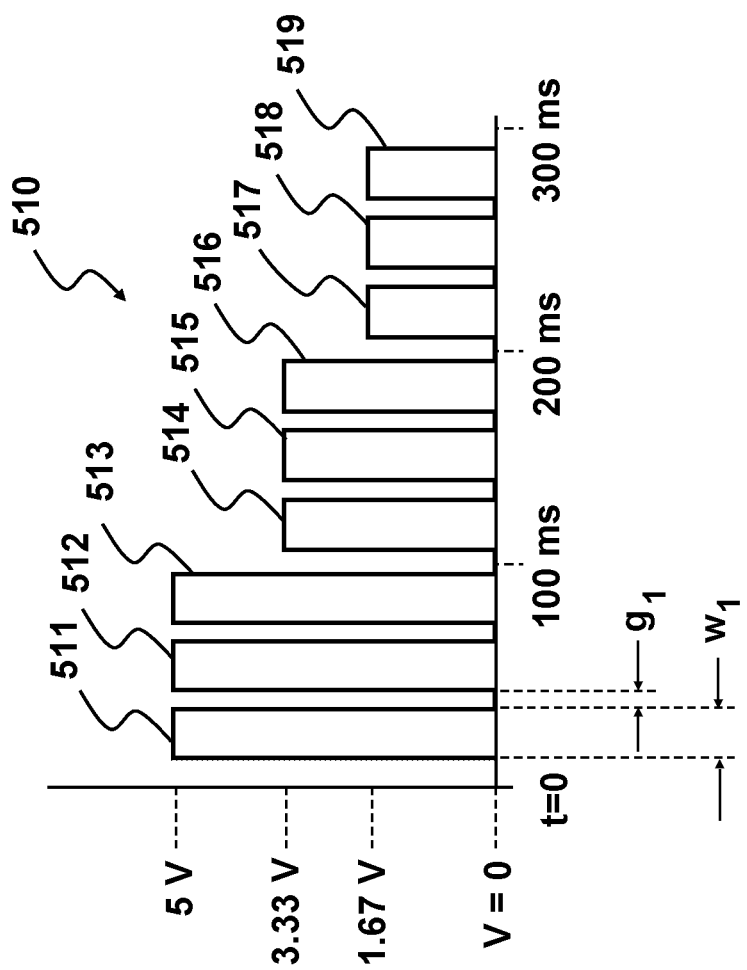
FIGS. 5A and 5B depict pulses with time-varying magnitude based on magnitude values of a time-varying magnitude envelope, according to embodiments hereof.
Figure 5B:
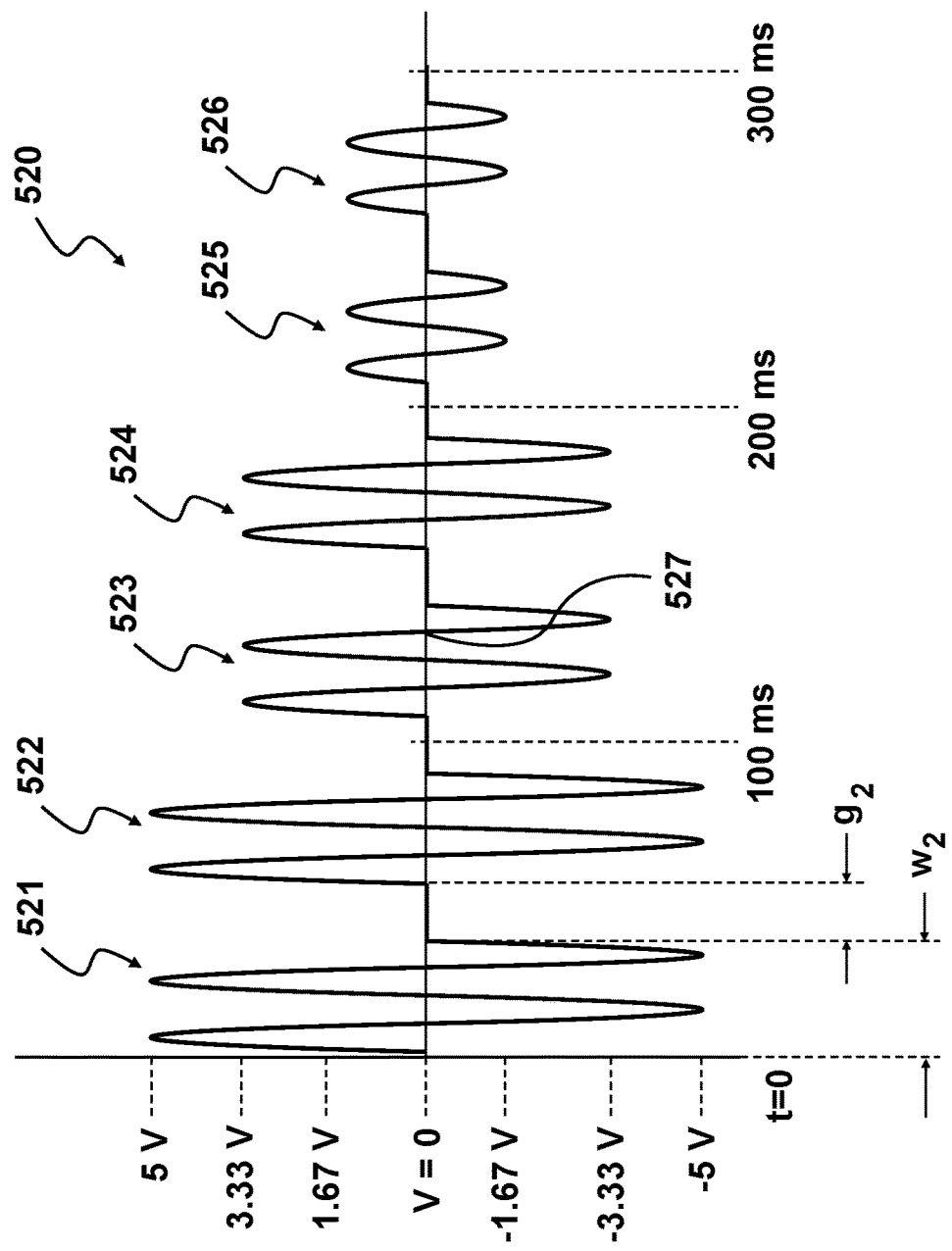

FIGS. 5A and 5B depict drive signals that vary only a magnitude of the pulses thereof based on a magnitude envelope described in a haptic track. More specifically, FIG. 5A depicts a drive signal 510 that includes a series of pulses 511, 512, 513, 514, 515, 516, 517, 518, 519, which may also be referred to as a pulse train. Each pulse of the pulses 511-519 may include only positive voltage values or only negative values. None of the pulses 511-519 in FIG. 5A include any nonzero duration of zero voltage value or zero current value. Additionally, each pulse of the pulses 511-519 may be immediately preceded by a nonzero duration of zero voltage value or zero current value, and immediately followed by another nonzero duration of zero voltage value or zero current value. FIG. 5A illustrates each pulse of the pulses 511-519 as having a square shape or, more generally, a square waveform, which is not periodic. While FIG. 5A depicts the pulses 511-519 as having a rectangular shape, the pulses may have a different shape, e.g., trapezoidal shape, in other embodiments.

In the embodiment of FIG. 5A, the pulses 511-519 have magnitude values that are based on, e.g., magnitude values of the time-varying magnitude envelope 210 described by the haptic track 107A. For instance, the magnitude value of pulses 511, 512, and 513 (i.e., magnitude value of 5 V) may be mapped to or otherwise based on the magnitude value of the first portion 211 of the magnitude envelope 210 (i.e., magnitude value of 255). Similarly, the magnitude value of pulses 514, 515, 516 (i.e., magnitude value of 3.33 V) may be mapped to the magnitude value of the second portion 213 of the magnitude envelope 210 (i.e., magnitude value of 170), while the magnitude value of pulses 517, 518, 519 may be mapped to the magnitude value of the third portion 215 of the magnitude envelope 210 (i.e., magnitude value of 85). Moreover, the pulses 511-519 in FIG. 5A may have the same pulse duration, also referred to as pulse width $w_1$, and the same separation duration, also referred to as gap $g_1$ between consecutive pulses. In other words, the pulse duration and separation duration for the drive signal 510 does not change over time. In an embodiment, the separation duration may be measured between, e.g., an end of one pulse and a start of a next pulse.

FIG. 5B depicts a series of sine pulses in which pulse duration and separation durations between consecutive pulses do not change. More specifically, FIG. 5B illustrates a drive signal 520 that includes pulses 521, 522, 523, 524, 525, 526. Each pulse of the pulses 521-526 may include only positive voltage values, negative voltage values, and one or more zero crossing points, such as zero crossing point 527. In other words, none of the pulses 521-526 in FIG. 5B includes any nonzero duration of zero voltage value or zero current value. A particular nonzero duration of zero voltage or zero current may include a time range from $t_1$ to $t_2$ in which the drive signal 520 has zero voltage value or zero current value, wherein $t_2$ is greater than $t_1$. Additionally, each pulse of the pulses 521-526 may be immediately preceded by a nonzero duration of zero voltage value or zero current value, and immediately followed by another nonzero duration of zero voltage value or zero current value. While each pulse of the pulses 521-526 has a sine waveform, in another embodiment the pulses 521-526 may have a different periodic waveform, such as a square wave that alternates between a positive voltage value (e.g., 5 V) and a negative voltage value (e.g., −5 V).

In the embodiment of FIG. 5B, the pulses 521-526 have magnitude values that are based on, e.g., magnitude values of the time-varying magnitude envelope 210 described by the haptic track 107A. For instance, the magnitude value of pulses 521 and 522, (i.e., magnitude value of 10 $V_{pp}$) may be based on the magnitude value of the first portion 211 of the magnitude envelope 210 (i.e., magnitude value of 255). Similarly, the magnitude value of pulses 523 and 524 (i.e., magnitude value of 6.66 $V_{pp}$) may be based on the magnitude value of the second portion 213 of the magnitude envelope 210 (i.e., magnitude value of 170), while the magnitude value of pulses 525 and 526 (i.e., magnitude value of 3.34 $V_{pp}$) may be based on the magnitude value of the third portion 215 of the magnitude envelope 210 (i.e., magnitude value of 85). Moreover, the pulses 521-526 in FIG. 5B may have the same pulse duration or pulse width $w_2$, and the same separation duration or gap $g_2$ between consecutive pulses. In other words, the pulse duration and pulse separation for drive signal 520 does not change over time.

Figure 6A:
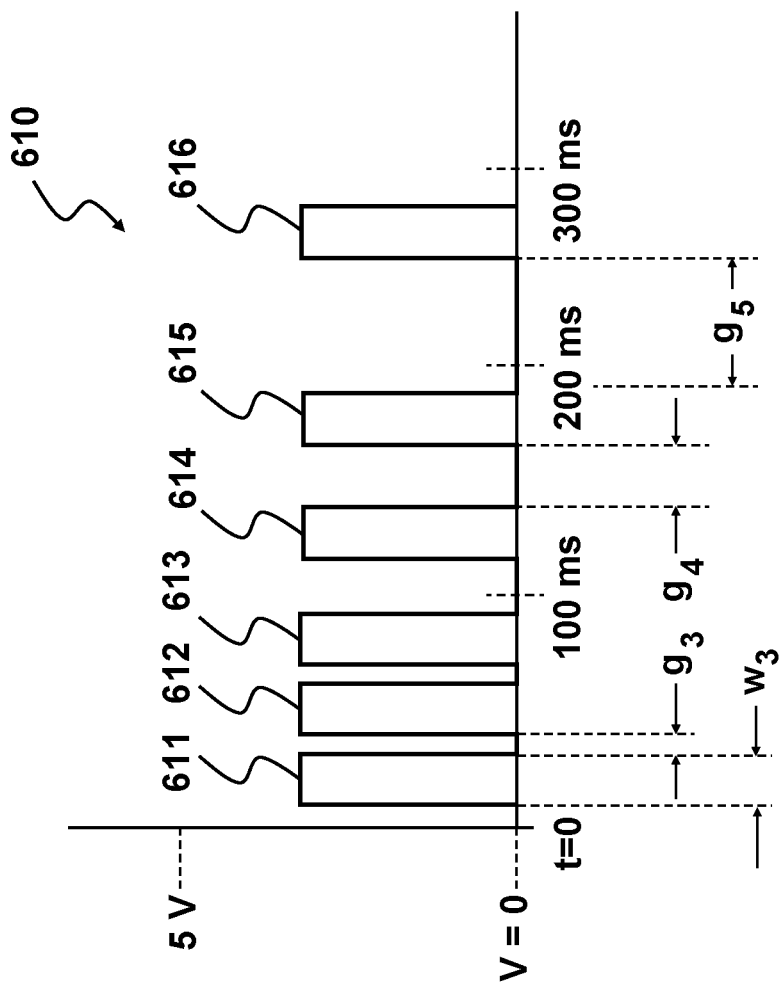
FIGS. 6A and 6B depict pulses with pulse durations or separation durations that are based on magnitude values of a time-varying magnitude envelope, according to embodiments hereof.

FIGS. 6A, 6B, 7A, and 7B depict drive signals in which pulse duration and separation duration between consecutive pulses vary based on a magnitude envelope that is described by a haptic track. More specifically, FIG. 6A illustrates a drive signal 610 that includes a series of pulses 611, 612, 613, 614, 615, and 616 for which separation durations (also referred to as separation duration values) of consecutive pulses of the pulses 611-616 may vary based on magnitude values of the time-varying magnitude envelope 210 described by the haptic track 107A. For instance, pulse 611 and pulse 612 in FIG. 6A may be separated by a separation duration of $g_3$ (pulse 612 and pulse 613 may also have a separation duration of $g_3$), wherein $g_3$ maps to the magnitude value of the first portion 211 of the magnitude envelope 210. Additionally, pulse 614 and pulse 615 in FIG. 6A may be separated by a separation duration of $g_4$, wherein $g_4$ maps to the magnitude value of the second portion 213 of the magnitude envelope 210. Further, pulse 615 and pulse 616 may be separated by a separation duration of $g_5$, wherein $g_5$ maps to the magnitude value of the third portion 215 of the magnitude envelope 210. The mapping between magnitude values of the magnitude envelope 210 and separation durations may be a linear mapping, a nonlinear mapping, or some other mapping. In an embodiment, higher magnitude values may map to shorter separation durations, while lower magnitude values may map to longer separation durations. In the embodiment of FIG. 6A, at least two of the separation durations $g_3$, $g_4$, $g_5$ are different. In the embodiment of FIG. 6A, each of the pulses 611-616 may have a same pulse duration $w_3$. In another embodiment, the pulses 611-616 may also have different pulse durations. For instance in an embodiment illustrated in FIG. 6B, at least two of the pulse durations $w_4$, $w_5$, $w_6$ of the pulses 621-629 are different.

Figure 6B:
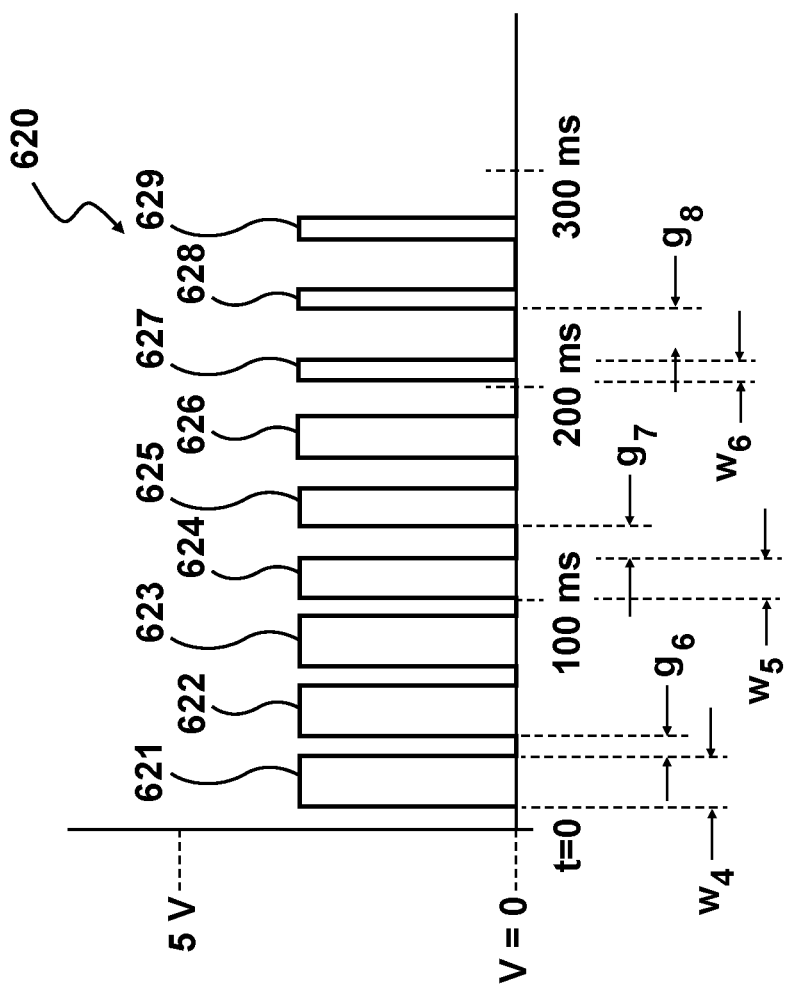
Figure 7A:
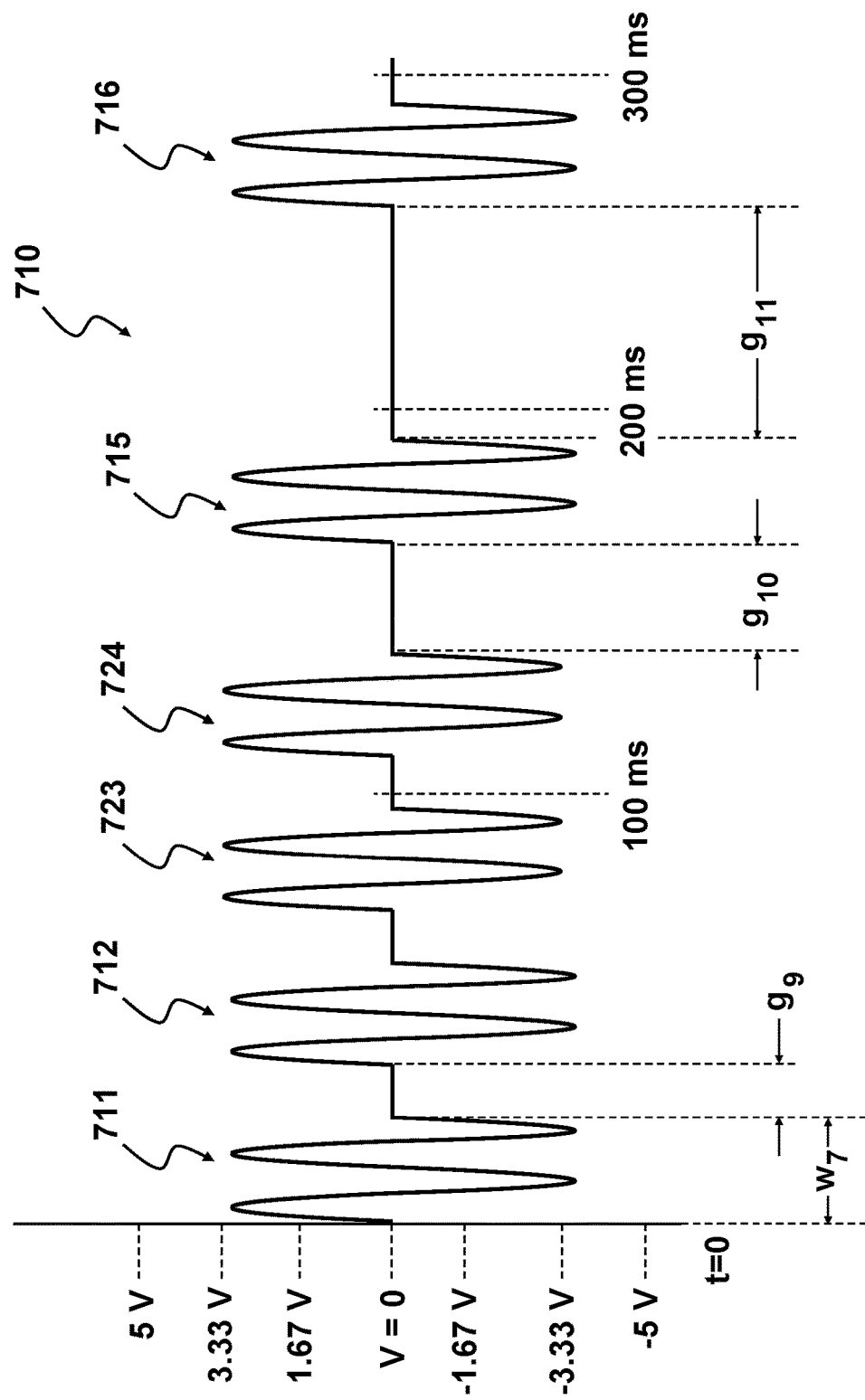
FIGS. 7A and 7B depict pulses with pulse durations or separation durations that are based on magnitude values of a time-varying magnitude envelope, according to embodiments hereof.
Figure 7B:
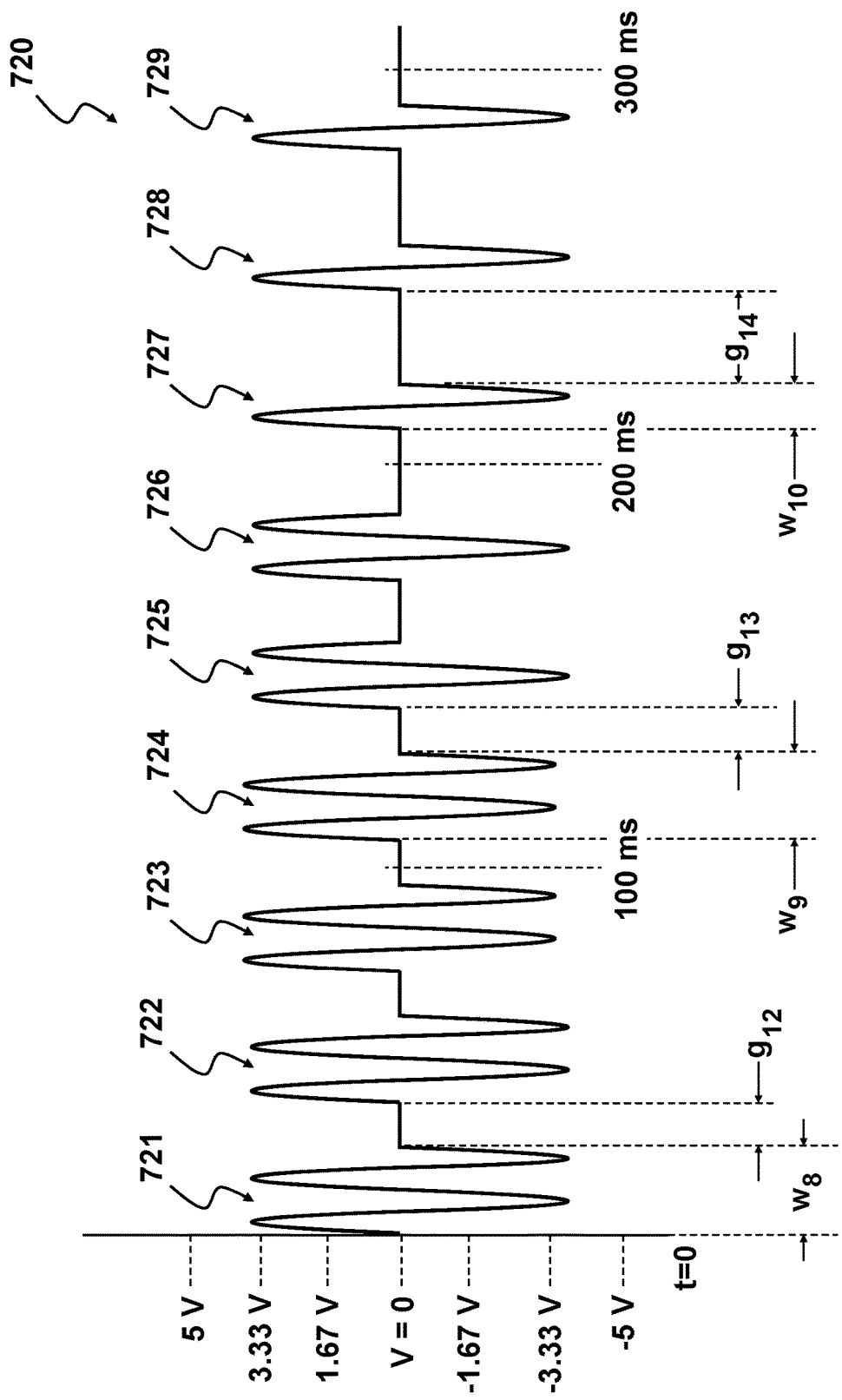

FIG. 6B illustrates a drive signal in which pulse duration varies based on magnitude values of a magnitude envelope. More specifically, FIG. 6B depicts a drive signal 620 having a series of pulses 621, 622, 623, 624, 625, 626, 627, 628, and 629. The pulses 621-629 may have pulse durations (also referred to as pulse duration values) that are based on magnitude values of the time-varying magnitude envelope 210 described by the haptic track 170A. For instance, pulses 621-623 each has a pulse duration $w_4$ that maps to the magnitude value of the first portion 211 of the magnitude envelope 210. Further, pulses 624-626 each has a pulse duration $w_5$ that maps to the magnitude value of the second portion 213 of the magnitude envelope 210, and the pulses 627-629 each has a pulse duration $w_5$ that maps to the magnitude value of the third portion 215 of the magnitude envelope 210. The mapping between magnitude values and pulse durations (also referred to as pulse duration values) may be a linear mapping, a nonlinear mapping, or some other mapping. In some instances, higher magnitude values may map to longer pulse durations, while shorter magnitude values may map to shorter pulse durations. In an embodiment, as illustrated in FIGS. 7A and 7B, at least two of the pulse durations $w_8$, $w_9$, $w_{10}$ of the pulses 721-729 are different, or at least two of the separation durations $g_9$, $g_{10}$, $g_{11}$ between the pulses 711-716 are different. In an embodiment, at least two of the pulse durations are different, and all of the separation durations are the same.

In the embodiment of FIG. 6B, the separation durations between the pulses 621-629 may also vary. For instance, pulse 621 and pulse 622 may be separated by a separation duration $g_6$, while pulse 624 and pulse 625 are separated by a longer separation duration $g_7$, while pulse 627 and pulse 628 are separated by an even longer separation duration $g_8$. More specifically, the embodiment of FIG. 6B may maintain a constant duration between start times of two consecutive pulses, such that shortening one of the pulses may lengthen a separation duration between the two pulses. In another embodiment, however, the separation durations between pulses 621-629 may be kept constant.

In an embodiment, the pulses 611-616 of the drive signal 610 or the pulses 621-629 of the drive signal 620 may have the same magnitude values. In another embodiment, they may have different magnitude values. In an embodiment, the pulses 611-616 or 621-629 may have weakened magnitudes, in order to decrease user perception of gaps between pulses and the effect of such gaps on the haptic effect. Decreasing user perception of the effect of such gaps may make the haptic effect feel less choppy. For instance, when the control unit 102 generates the pulses 611-616 or 621-629 of the drive signal 610 or 620, it may cause the pulses 611-616 or 621-629 to have a magnitude value that is less than a defined threshold (e.g., less than 3.5 V). In another example, the control unit 102 may weaken a pulse with an attenuation factor. For instance, the control unit may determine a maximum magnitude value of the magnitude envelope (e.g., a magnitude value of 255 for magnitude envelope 210, and about value of 200 for magnitude envelope 220). The determined maximum magnitude value may be a first magnitude value. The control unit 102 may then determine, as a second magnitude value, a magnitude value for the drive signal (e.g., 5 V) based on the first magnitude value. The control unit 102 may then multiply the second magnitude value by an attenuation factor to determine a third magnitude value, wherein the attenuation factor is less than 1 (e.g., 0.5). The control unit may then generate the pulses with the third magnitude value, such that the pulses have the third magnitude value.

Similar to FIG. 6A, FIG. 7A illustrates a drive signal in which separation durations between consecutive pulses vary based on a magnitude envelope that is described by a haptic track. More specifically, FIG. 7A illustrates a drive signal 710 that includes a series of pulses 711, 712, 713, 714, 715, and 716. In the embodiment of FIG. 7A, pulse 711 and pulse 712 may be separated by a separation duration of $g_9$, wherein $g_9$ maps to the magnitude value of the first portion 211 of the magnitude envelope 210. Additionally, pulse 714 and pulse 715 in FIG. 7A may be separated by a separation duration of $g_{10}$, wherein $g_{10}$ maps to the magnitude value of the second portion 213 of the magnitude envelope 210. Further, pulse 715 and pulse 716 may be separated by a separation duration of $g_{11}$, wherein $g_{11}$ maps to the magnitude value of the third portion 215 of the magnitude envelope 210. The separation durations $g_9$, $g_{10}$, and $g_{11}$ may successively increase in value, which may increase a pitch at which a resulting haptic effect is perceived. In the embodiment of FIG. 7A, each of the pulses 711-716 may have the same pulse duration $w_7$.

Similar to FIG. 6B, FIG. 7B illustrates a drive signal in which pulse duration varies based on magnitude values of a magnitude envelope. More specifically, FIG. 7B depicts a drive signal 720 having a series of pulses 721, 722, 723, 724, 725, 726, 727, 728, and 729. The pulses 721-729 may have pulse durations that are based on magnitude values of the time-varying magnitude envelope 210 described by haptic track 170A. For instance, pulses 721-723 each has a pulse duration $w_8$ that maps to the magnitude value of the first portion 211 of the magnitude envelope 210. Further, pulses 724-726 each has a pulse duration $w_9$ that maps to the magnitude value of the second portion 213 of the magnitude envelope 210, and the pulses 727-729 each has a pulse duration $w_{10}$ that maps to the magnitude value of the third portion 215 of the magnitude envelope 210. In the embodiment of FIG. 7B, the pulse durations $w_8$, $w_9$, $w_{10}$ may successively decrease in value.

FIG. 8 depicts a flow diagram for a method 800 for generating haptic effects on the haptic-enabled device 100 having the control unit 102 and the haptic output device 104, according to embodiments herein. In an embodiment, method 800 starts at step 801, in which the control unit 102 receives a haptic track 107A that describes a time-varying magnitude envelope for driving the haptic output device 104 to generate a haptic effect. The haptic track may be received from the memory 106, from another device via a communication interface 103, or from some other location. In an embodiment, the haptic track 107 may have been authored for or otherwise associated with a first type of haptic output device, such as a SD haptic output device, while the haptic output device 104 may be a second type of haptic output device, such as an HD haptic output device, different than the first type of haptic output device. In an embodiment, the second type of haptic output device has higher frequency bandwidth than the first type of haptic output device. In other words, a frequency response profile of the second type of haptic output device may have a higher bandwidth compared to a frequency response profile of the first type of haptic output device. For instance, the first type of haptic output device may be designed to be driven at only a single frequency, while the second type of haptic output device may be designed to be driven in a range of frequencies having a nonzero bandwidth. In some cases, the time-varying magnitude envelope, such as magnitude envelope 210 or 220, is not a periodic waveform.

In step 803, the control unit 102 generates a periodic drive signal with a time-varying frequency that is based on magnitude values of the time-varying magnitude envelope described in the haptic track. In an embodiment, step 803 may be based on a defined mapping between values of the time-varying magnitude envelope and frequency values for the periodic drive signal. The mapping may be stored in the memory 106 of the haptic-enabled device 100, or at another location. The mapping may, in some implementations, map a defined magnitude envelope upper limit to a resonant frequency value for the haptic output device 104, and map other magnitude values of the magnitude envelope to non-resonant frequency values. In an embodiment, the periodic drive signal, such as periodic drive signal 410, may have a constant magnitude over time.

In step 805, the control unit 102 outputs the periodic drive signal to the haptic output device 104, to cause the haptic output device 104 to generate the haptic effect based on the periodic drive signal.

Figure 9A:
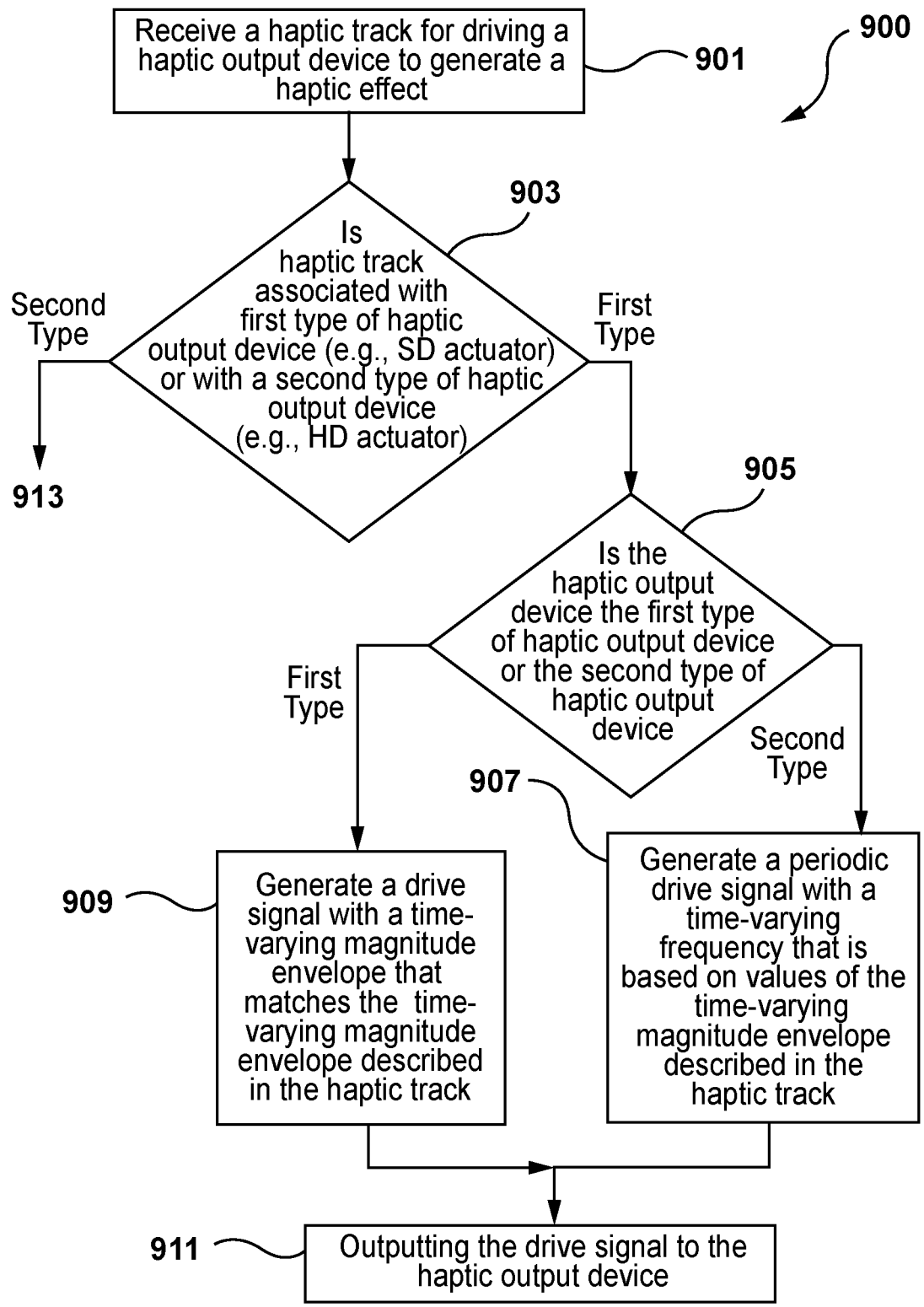
FIGS. 9A and 9B provide a flow diagram that illustrates steps of a method for generating a haptic effect with a drive signal, according to an embodiment hereof.
Figure 9B:
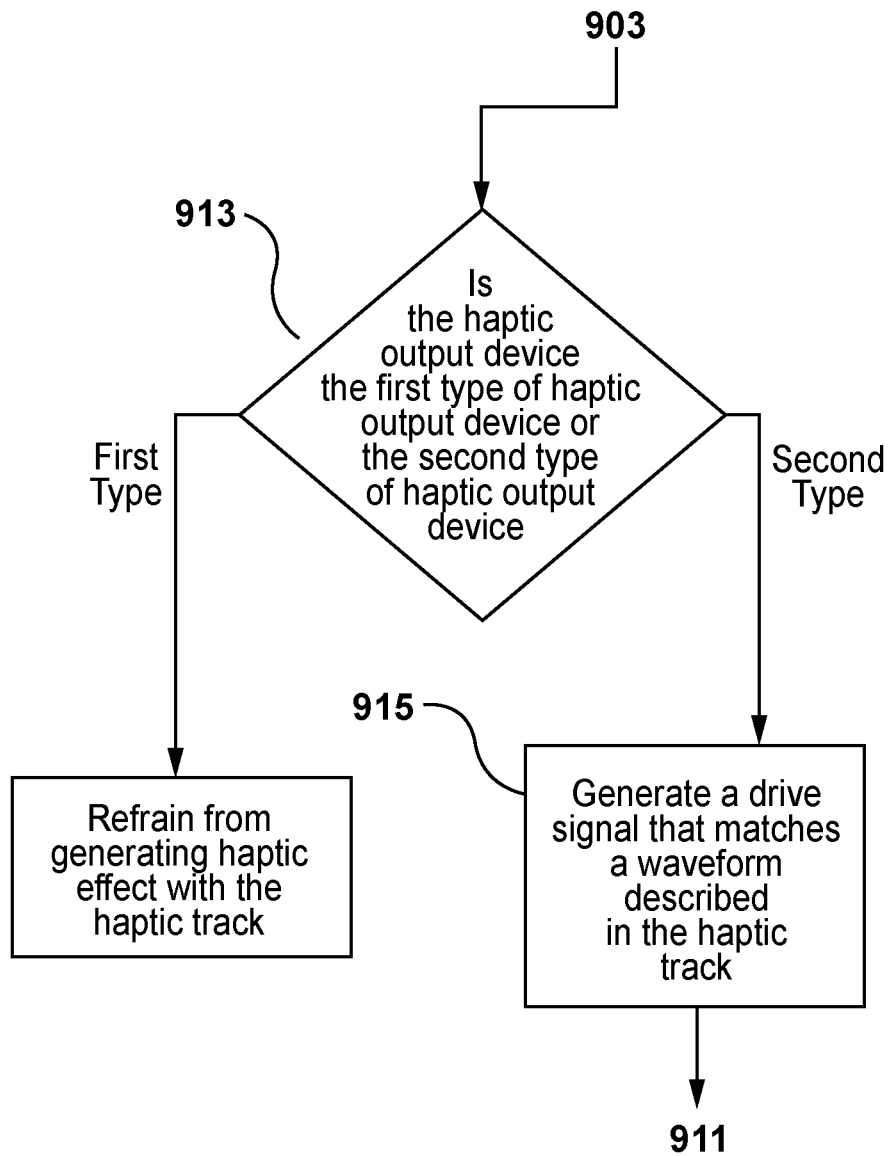

FIGS. 9A and 9B depict another method 900 for generating haptic effects on the haptic-enabled device 100. The method 900 includes a step 901, in which the control unit 102 receives a haptic track for driving the haptic output device 104 to generate a haptic effect. The haptic track may be associated with a first type of haptic output device, such as a SD haptic output device, or with a second type of haptic output device, such as an HD haptic output device. Further, the haptic output device 104 may be the first type of haptic output device or the second type of haptic output device.

In step 903, the control unit 102 may determine whether the haptic track is associated with the first type of haptic output device or with the second type of haptic output device. In an embodiment, this determination may be based on an identifier or other metadata in the haptic track that identifies a type of haptic output device associated with the haptic track. In an embodiment, this determination may be based on determining whether the haptic track describes a magnitude envelope, which may often be a non-periodic waveform. More specifically, if the haptic track describes a waveform that is not periodic, such a waveform is likely a magnitude envelope for defining a DC drive signal to drive, e.g., an SD ERM actuator, or for modulating a periodic drive signal to drive, e.g., a SD LRA. Thus, if a haptic track describes a non-periodic waveform, the waveform may be determined to be a magnitude envelope for the first type of haptic output device. If the haptic track instead describes a non-periodic waveform, or more generally a waveform that alternates between positive values and negative values, those positive values and negative values of the waveform may be used to directly define voltage values or current values of the drive signal for, e.g., a piezoelectric actuator or EAP actuator or wideband LRA. Thus, if the haptic track describes a waveform that is periodic, or that more generally alternates between positive values and negative values, such a waveform may be an actual drive signal for a second type of haptic output device. For instance, if the haptic track describes a sinusoidal waveform, the control unit 102 may determine that the sinusoidal waveform is not a magnitude envelope for the first type of haptic output device, and is instead a waveform used to directly define a sinusoidal drive signal for the second type of haptic output device.

In step 905, in response to a determination that the haptic track is associated with the first type of haptic output device, the control unit 102 may determine whether the haptic output device 104 is the first type of haptic output device or the second type of haptic output device. In an embodiment, this determination may be based on a hardware or software flag stored by the haptic output device. In an embodiment, this determination may be based on a look-up table that identifies a haptic output device type of different models of haptic output devices.

In step 907, in response to a determination that the haptic output device is the second type of haptic output device, the control unit 102 may generate a periodic drive signal with a time-varying frequency that is based on the time-varying magnitude envelope described in the haptic track.

In step 909, in response to a determination that the haptic output device is the first type of haptic output device, the control unit 102 may generate a drive signal with a time-varying magnitude envelope that matches the time-varying magnitude envelope described in the haptic track. For instance, the time-varying magnitude envelope of the drive signal may match a shape of the time-varying magnitude envelope described in the haptic track. After step 907 or step 909, the control unit 102 in step 911 outputs the drive signal to the haptic output device 104 to generate the haptic effect.

Referring to FIG. 9B, if the haptic track is associated with the second type of haptic output device, then the control unit 102 may determine in step 913 whether the haptic output device is the first type of haptic output device or the second type of haptic output device. If the haptic output device is the first type of haptic output device, the control unit 102 may determine that the haptic output device is unsuitable for rendering the haptic track, which is associated with the second type of haptic output device. Thus, the control unit 102 may refrain from generating a haptic effect with the haptic track. If, on the other hand, the haptic output device is the second type of haptic output device, the control unit 102 may generate a drive signal that matches a waveform described in the haptic track. For instance, if the haptic track describes a sinusoidal waveform having a certain frequency, the control unit may generate a sinusoidal drive signal having the same frequency. The control unit 102 in step 911 may then output the drive signal to the haptic output device 104.

Figure 10:
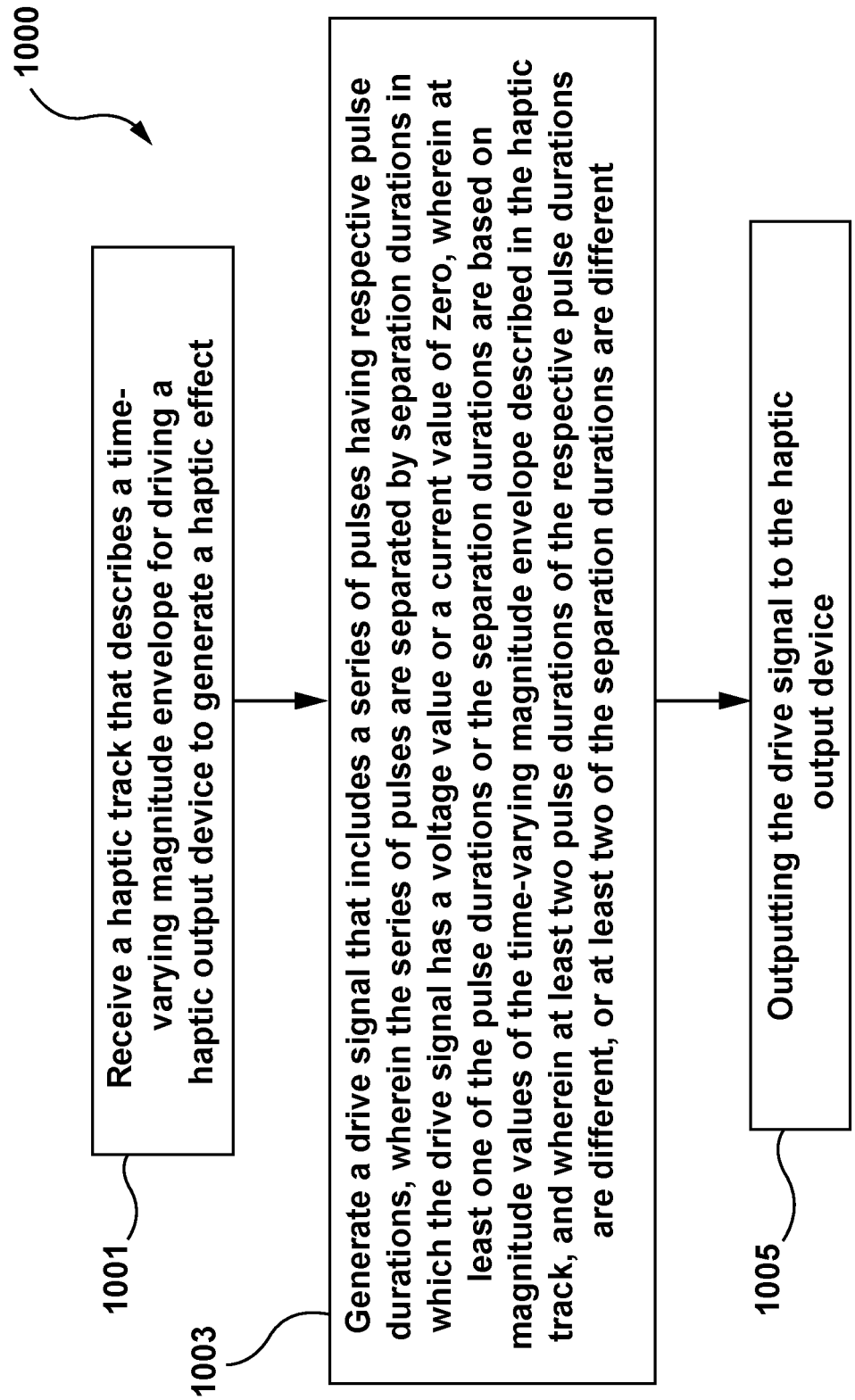
FIG. 10 provides a flow diagram that illustrates steps of a method for generating a haptic effect with a drive signal that has a series of pulses, according to an embodiment hereof.

FIG. 10 depicts a method 1000 for generating a haptic effect with the haptic-enabled device 100, which includes the control unit 102 and the haptic output device 104. In an embodiment, the method 1000 includes step 1001, in which the control unit 102 receives a haptic track that describes a time-varying magnitude envelope for driving the haptic output device 104. In an embodiment, the haptic track is associated with a first type of haptic output device, e.g., SD haptic output device, and the haptic output device 104 is also the first type of haptic output device.

In step 1003, the control unit 102 generates a drive signal (e.g., drive signals 610, 620, 710, or 720) that includes a series of pulses having respective pulse durations. The series of pulses are separated by separation durations in which the drive signal has a voltage value or a current value of zero, wherein at least one of the pulse durations or the separation durations are based on magnitude values of the time-varying magnitude envelope described in the haptic track. In an embodiment, at least two pulse durations of the respective pulse durations are different, or at least two of the separation durations are different. In an embodiment, all of the pulse durations are the same, while at least two of the separation durations are different. In an embodiment, the control unit 102 may multiply magnitude values of the series of pulses by a defined attenuation factor that is less than 1, so as to weaken the pulses, as discussed above. In step 1005, the control unit outputs the drive signal to the haptic output device 104 to generate the haptic effect.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A method of generating haptic effects on a haptic-enabled device having a control unit and a haptic output device, the method comprising:
   receiving, by the control unit, a haptic track that describes a time-varying magnitude envelope for driving the haptic output device to generate a haptic effect;
   generating, by the control unit, a periodic drive signal with a time-varying frequency that is based on a defined mapping between magnitude values of the time-varying magnitude envelope described in the haptic track and frequency values for the periodic drive signal; and
   outputting, by the control unit, the periodic drive signal to the haptic output device, to cause the haptic output device to generate the haptic effect based on the periodic drive signal.

2. The method of claim 1, wherein the haptic track is associated with a first type of haptic output device, and wherein the haptic output device is a second type of haptic output device different than the first type of haptic output device.

3. The method of claim 2, wherein the first type of haptic output device is designed to be driven at only a single frequency, and the second type of haptic output device is designed to be driven in a range of frequencies having a nonzero bandwidth, such that the second type of haptic output device has a nonzero acceleration bandwidth.

4. The method of claim 2, wherein the first type of haptic output device is a standard-definition haptic output device, and the second type of haptic output device is a high-definition haptic output device.

5. The method of claim 4, wherein the standard-definition haptic output device includes at least one of: an eccentric rotating mass (ERM) actuator designed to be driven with only a direct current (DC) signal, or a linear resonant actuator (LRA) designed to be driven at only a single frequency.

6. The method of claim 5, wherein the LRA that is designed to be driven at only a single frequency is a first LRA, and wherein the high-definition haptic output device is a second LRA designed to be driven in a range of frequencies having a nonzero bandwidth, such that the second LRA has a nonzero acceleration bandwidth.

7. The method of claim 5, wherein the high-definition haptic output device includes at least one of a piezoelectric actuator or an electroactive polymer (EAP) actuator.

8. The method of claim 2, further comprising determining whether the haptic track is associated with the first type of haptic output device or with the second type of haptic output device, and whether the haptic output device is the first type of haptic output device or the second type of haptic output device, wherein the step of generating the periodic drive signal with the time-varying frequency based on the defined mapping between the magnitude values of the time-varying magnitude envelope and the frequency values for the periodic drive signal is performed only in response to a determination that the haptic track is associated with the first type of haptic output device and a determination that the haptic output device is the second type of haptic output device.

9. The method of claim 1, wherein the periodic drive signal has a constant magnitude over time, and alternates between one or more positive voltage values or current values and one or more negative voltage values or current values.

10. The method of claim 9, wherein the periodic drive signal includes only one or more positive voltage values or current values, one or more negative voltage values or current values, and one or more zero crossing points, and does not have any nonzero duration of zero voltage value or zero current value.

11. The method of claim 9, wherein the time-varying magnitude envelope described by the haptic track is not a periodic waveform.

12. The method of claim 1, wherein the magnitude values of the time-varying magnitude envelope are in a range between a defined magnitude envelope lower limit and a defined magnitude envelope upper limit, wherein the haptic output device has at least one resonant frequency value, and wherein the defined mapping maps the defined magnitude envelope upper limit to the at least one resonant frequency value, and maps one or more other magnitude values of the time-varying magnitude envelope to one or more non-resonant frequency values.

13. The method of claim 1, wherein the defined mapping defines a linear relationship between magnitude values of the time-varying magnitude envelope and frequency values of the periodic drive signal.

14. The method of claim 1, wherein the defined mapping is based on a frequency response profile of the haptic output device, wherein the frequency response profile describes how haptic effect magnitude of the haptic output device varies as a function of drive signal frequency.

15. The method of claim 1, wherein the periodic drive signal is a sinusoidal wave that alternates between positive voltage values and negative voltage values, or is a square wave that alternates between a positive voltage value and a negative voltage value.

16. A method of generating haptic effects on a haptic-enabled device having a control unit and a haptic output device, the method comprising:
   receiving, by the control unit, a haptic track that describes a time-varying magnitude envelope for driving the haptic output device to generate a haptic effect;
   generating, by the control unit, a drive signal that includes a series of pulses having respective pulse durations, wherein the series of pulses are separated by separation durations in which the drive signal has a voltage value or a current value of zero, wherein the respective pulse durations are based on magnitude values of the time-varying magnitude envelope described in the haptic track, and wherein at least two pulse durations of the respective pulse durations are different, and wherein all of the separation durations are the same; and
   outputting, by the control unit, the drive signal to the haptic output device, to cause the haptic output device to generate the haptic effect based on the drive signal.

17. The method of claim 16, wherein the haptic track is associated with a first type of haptic output device, and wherein the haptic output device is also the first type of haptic output device, wherein the first type of haptic output device is a standard-definition haptic output device.

18. The method of claim 16, wherein generating the drive signal comprises:
   determining a maximum magnitude value of the time-varying magnitude envelope, the maximum magnitude value being a first magnitude value;
   determining, as a second magnitude value, a magnitude value for the drive signal based on the first magnitude value;
   multiplying the second magnitude value by an attenuation factor to determine a third magnitude value, wherein the attenuation factor is less than 1, and wherein each pulse of the series of pulses is generated with the third magnitude value.

19. A haptic-enabled device comprising:
   a haptic output device;
   a communication interface;
   a memory;
   a control unit configured
      to receive, from the communication interface or the memory, a haptic track that describes a time-varying magnitude envelope for driving the haptic output device to generate a haptic effect,
      to generate a periodic drive signal with a time-varying frequency that is based on values of the time-varying magnitude envelope described in the haptic track, wherein the periodic drive signal has a constant magnitude over time, and alternates between one or more positive voltage values or current values and one or more negative voltage values or current values, and
      to output the periodic drive signal to the haptic output device, to cause the haptic output device to generate the haptic effect based on the periodic drive signal.

* * * * *